(12) United States Patent
Zalewski et al.

(10) Patent No.: US 8,840,470 B2
(45) Date of Patent: Sep. 23, 2014

(54) METHODS FOR CAPTURING DEPTH DATA OF A SCENE AND APPLYING COMPUTER ACTIONS

(75) Inventors: Gary Zalewski, Oakland, CA (US); Mike Haigh, London (GB)

(73) Assignees: Sony Computer Entertainment America LLC, San Mateo, CA (US); Sony Computer Entertainment Europe Limited, London (GB)

( * ) Notice: Subject to any disclaimer, the term of this patent is extended or adjusted under 35 U.S.C. 154(b) by 1397 days.

(21) Appl. No.: 12/392,044

(22) Filed: Feb. 24, 2009

(65) Prior Publication Data
US 2009/0215533 A1 Aug. 27, 2009

Related U.S. Application Data

(60) Provisional application No. 61/032,028, filed on Feb. 27, 2008.

(51) Int. Cl.
| | | |
|---|---|---|
| *A63F 13/00* | (2014.01) | |
| *H04N 21/475* | (2011.01) | |
| *G06K 9/00* | (2006.01) | |
| *H04N 21/4223* | (2011.01) | |
| *H04N 21/478* | (2011.01) | |

(52) U.S. Cl.
CPC .............. *A63F 13/00* (2013.01); *H04N 21/4755* (2013.01); *A63F 2300/695* (2013.01); *A63F 2300/201* (2013.01); *G06K 9/00208* (2013.01); *H04N 21/4223* (2013.01); *H04N 21/4781* (2013.01); *H04N 21/4751* (2013.01); *A63F 2300/1093* (2013.01); *A63F 2300/1006* (2013.01); *G06K 9/00281* (2013.01)
USPC .................. 463/32; 463/30; 463/31

(58) Field of Classification Search
USPC ........................................................... 463/32
See application file for complete search history.

(56) References Cited

U.S. PATENT DOCUMENTS

| | | | |
|---|---|---|---|
| 3,943,277 A | 3/1976 | Everly et al. .................. | 348/169 |
| 4,263,504 A | 4/1981 | Thomas ......................... | 235/454 |

(Continued)

FOREIGN PATENT DOCUMENTS

| | | | |
|---|---|---|---|
| EP | 0353200 | 1/1990 | .............. G01S 17/10 |
| EP | 0652686 | 5/1995 | ............... H04R 1/40 |

(Continued)

OTHER PUBLICATIONS

"The Tracking Cube: A Three-Dimentional Input Device", IBM Technical Disclosure Bulletin, Aug. 1, 1989, pp. 91-95, No. 3B, IBM Corp.New York, U.S.

(Continued)

*Primary Examiner* — Colleen Matthews
*Assistant Examiner* — William Harriston
(74) *Attorney, Agent, or Firm* — Martine Penilla Group, LLP

(57) ABSTRACT

A computer-implemented method is provided to automatically apply predefined privileges for identified and tracked users in a space having one or more media sources. The method includes an operation to define and save to memory, a user profile. The user profile may include data that identifies and tracks a user with a depth-sensing camera. In another operation privileges that define levels of access to particular media for the user profile are defined and saved. The method also includes an operation to capture image and depth data from the depth-sensing camera of a scene within the space. In yet another operation, the user is tracked and identified within the scene from the image and depth data. In still another operation the defined privileges are automatically applied to one or more media sources, so that the user is granted access to selected content from the one or more media sources.

12 Claims, 17 Drawing Sheets

(56) References Cited

U.S. PATENT DOCUMENTS

| | | | | |
|---|---|---|---|---|
| 4,313,227 A | 1/1982 | Eder | | 398/106 |
| 4,558,864 A | 12/1985 | Medwedeff | | 273/148 B |
| 4,565,999 A | 1/1986 | King et al. | | 345/158 |
| 4,802,227 A | 1/1989 | Elko et al. | | 381/92 |
| 4,823,001 A | 4/1989 | Kobayashi et al. | | 356/616 |
| 4,843,568 A | 6/1989 | Krueger et al. | | 382/100 |
| 5,034,986 A | 7/1991 | Karmann et al. | | 382/103 |
| 5,055,840 A | 10/1991 | Bartlett | | 341/31 |
| 5,111,401 A | 5/1992 | Everett et al. | | 701/24 |
| 5,144,594 A | 9/1992 | Gilchrist | | 367/129 |
| 5,260,556 A | 11/1993 | Lake et al. | | 235/494 |
| 5,297,061 A | 3/1994 | Dementhon et al. | | 345/180 |
| 5,335,011 A | 8/1994 | Addeo et al. | | 348/15 |
| 5,394,168 A | 2/1995 | Smith, III et al. | | 345/156 |
| 5,426,450 A | 6/1995 | Drumm | | 345/168 |
| 5,440,326 A | 8/1995 | Quinn | | 345/156 |
| 5,455,685 A | 10/1995 | Mori | | 348/363 |
| 5,473,701 A | 12/1995 | Cezanne et al. | | 381/92 |
| 5,485,273 A | 1/1996 | Mark et al. | | 356/350 |
| 5,534,917 A | 7/1996 | MacDougall | | 348/169 |
| 5,543,818 A | 8/1996 | Scott | | 345/168 |
| 5,557,684 A | 9/1996 | Wang et al. | | 382/107 |
| 5,563,988 A | 10/1996 | Maes et al. | | 345/421 |
| 5,568,928 A | 10/1996 | Munson et al. | | 463/37 |
| 5,581,276 A | 12/1996 | Cipolla et al. | | 345/156 |
| 5,583,478 A | 12/1996 | Renzi | | 340/407.1 |
| 5,586,231 A | 12/1996 | Florent et al. | | 345/472 |
| 5,611,731 A | 3/1997 | Bouton et al. | | 463/37 |
| 5,616,078 A | 4/1997 | Oh | | 463/8 |
| 5,638,228 A | 6/1997 | Thomas, III | | 360/60 |
| 5,649,021 A | 7/1997 | Matey et al. | | 382/124 |
| 5,675,825 A | 10/1997 | Dreyer et al. | | 395/800 |
| 5,675,828 A | 10/1997 | Stoel et al. | | 395/825 |
| 5,677,710 A | 10/1997 | Thompson-Rohrlich | | 345/173 |
| 5,706,364 A | 1/1998 | Kopec et al. | | 382/159 |
| 5,768,415 A | 6/1998 | Jagadish et al. | | 382/154 |
| 5,796,354 A | 8/1998 | Cartabiano et al. | | 341/22 |
| 5,818,424 A | 10/1998 | Korth | | 345/158 |
| 5,846,086 A | 12/1998 | Bizzi et al. | | 434/247 |
| 5,850,222 A | 12/1998 | Cone | | 345/418 |
| 5,850,473 A | 12/1998 | Andersson | | 382/165 |
| 5,861,910 A | 1/1999 | McGarry et al. | | 348/87 |
| 5,870,100 A | 2/1999 | DeFreitas | | 345/441 |
| 5,883,616 A | 3/1999 | Koizumi et al. | | 345/156 |
| 5,889,672 A | 3/1999 | Schuler et al. | | 700/83 |
| 5,900,863 A | 5/1999 | Numazaki | | 345/158 |
| 5,913,727 A | 6/1999 | Ahdoot | | 463/39 |
| 5,914,723 A | 6/1999 | Gajewska | | 345/597 |
| 5,917,493 A | 6/1999 | Tan et al. | | 715/835 |
| 5,923,306 A | 7/1999 | Smith et al. | | 345/2 |
| 5,923,318 A | 7/1999 | Zhai et al. | | 345/157 |
| 5,929,444 A | 7/1999 | Leichner | | 250/341.7 |
| 5,930,383 A | 7/1999 | Netaer | | 382/154 |
| 5,930,741 A | 7/1999 | Kramer | | 702/153 |
| 5,937,081 A | 8/1999 | O'Brill et al. | | 382/111 |
| 5,959,596 A | 9/1999 | McCarten et al. | | 345/2 |
| 5,963,250 A | 10/1999 | Parker et al. | | 348/211.6 |
| 5,993,314 A | 11/1999 | Dannenberg et al. | | 461/1 |
| 6,009,210 A | 12/1999 | Kang | | 382/276 |
| 6,021,219 A | 2/2000 | Andersson et al. | | 382/190 |
| 6,031,545 A | 2/2000 | Ellenby et al. | | 345/435 |
| 6,031,934 A | 2/2000 | Ahmad et al. | | 382/154 |
| 6,037,942 A | 3/2000 | Millington | | 715/835 |
| 6,044,181 A | 3/2000 | Szeliski et al. | | 382/284 |
| 6,049,619 A | 4/2000 | Anandan et al. | | 382/107 |
| 6,056,640 A | 5/2000 | Schaaij | | 463/4 |
| 6,057,909 A | 5/2000 | Yahav et al. | | 356/5.04 |
| 6,061,055 A | 5/2000 | Marks | | 382/276 |
| 6,075,895 A | 6/2000 | Qiao et al. | | 382/218 |
| 6,078,789 A | 6/2000 | Bodenmann et al. | | 455/66 |
| 6,091,905 A | 7/2000 | Yahav et al. | | 396/106 |
| 6,094,625 A | 7/2000 | Ralston | | 702/150 |
| 6,097,369 A | 8/2000 | Wambach | | 345/158 |
| 6,100,517 A | 8/2000 | Yahav et al. | | 250/208.1 |
| 6,100,895 A | 8/2000 | Miura et al. | | 345/426 |
| 6,101,289 A | 8/2000 | Kellner | | 382/276 |
| 6,115,052 A | 9/2000 | Freeman et al. | | 345/473 |
| 6,134,346 A | 10/2000 | Berman et al. | | 382/163 |
| 6,144,367 A | 11/2000 | Berstis | | 345/158 |
| 6,151,009 A | 11/2000 | Kanade et al. | | 345/641 |
| 6,160,540 A | 12/2000 | Fishkin et al. | | 345/184 |
| 6,166,744 A | 12/2000 | Jaszlics et al. | | 345/435 |
| 6,173,059 B1 | 1/2001 | Huang et al. | | 381/92 |
| 6,175,343 B1 | 1/2001 | Mitchell et al. | | 345/8 |
| 6,184,863 B1 | 2/2001 | Sibert et al. | | 345/156 |
| 6,191,773 B1 | 2/2001 | Maruno et al. | | 345/158 |
| 6,195,104 B1 | 2/2001 | Lyons | | 345/473 |
| 6,215,898 B1 | 4/2001 | Woodfill et al. | | 382/154 |
| 6,243,491 B1 | 6/2001 | Andersson | | 382/165 |
| 6,275,213 B1 | 8/2001 | Tremblay et al. | | 345/156 |
| 6,281,930 B1 | 8/2001 | Parker et al. | | 348/211.9 |
| 6,282,362 B1 | 8/2001 | Murphy et al. | | 386/46 |
| 6,295,064 B1 | 9/2001 | Yamaguchi | | 345/419 |
| 6,297,838 B1 | 10/2001 | Chang et al. | | 715/863 |
| 6,304,267 B1 | 10/2001 | Sata | | 345/427 |
| 6,307,549 B1 | 10/2001 | King et al. | | 715/810 |
| 6,307,568 B1 | 10/2001 | Rom | | 345/629 |
| 6,309,306 B1 * | 10/2001 | Geagley et al. | | 472/60 |
| 6,323,839 B1 | 11/2001 | Fukuda et al. | | 345/157 |
| 6,323,942 B1 | 11/2001 | Bamji | | 356/5.01 |
| 6,326,901 B1 | 12/2001 | Gonzales | | 340/7.2 |
| 6,327,073 B1 | 12/2001 | Yahav et al. | | 359/321 |
| 6,331,911 B1 | 12/2001 | Manassen et al. | | 359/260 |
| 6,346,929 B1 | 2/2002 | Fukushima et al. | | 354/8 |
| 6,351,661 B1 | 2/2002 | Cosman | | 600/426 |
| 6,371,849 B1 | 4/2002 | Togami | | 463/4 |
| 6,392,644 B1 | 5/2002 | Miyata et al. | | 345/419 |
| 6,394,897 B1 | 5/2002 | Togami | | 463/4 |
| 6,400,374 B2 | 6/2002 | Lanier | | 345/630 |
| 6,409,602 B1 | 6/2002 | Wiltshire et al. | | 463/42 |
| 6,411,392 B1 | 6/2002 | Bender et al. | | 358/1.14 |
| 6,411,744 B1 | 6/2002 | Edwards | | 382/294 |
| 6,417,836 B1 | 7/2002 | Kumar et al. | | 345/156 |
| 6,441,825 B1 | 8/2002 | Peters | | 345/473 |
| 6,473,516 B1 | 10/2002 | Kawaguchi et al. | | 382/100 |
| 6,498,860 B1 | 12/2002 | Sasaki et al. | | 382/103 |
| 6,504,535 B1 | 1/2003 | Edmark | | 345/419 |
| 6,516,466 B1 | 2/2003 | Jackson | | 725/62 |
| 6,533,420 B1 | 3/2003 | Eichenlaub | | 353/7 |
| 6,542,927 B2 | 4/2003 | Rhoads | | 709/217 |
| 6,545,706 B1 | 4/2003 | Edwards et al. | | 348/169 |
| 6,546,153 B1 | 4/2003 | Hoydal | | 382/285 |
| 6,556,704 B1 | 4/2003 | Chen | | 382/154 |
| 6,577,748 B2 | 6/2003 | Chang | | 382/100 |
| 6,580,414 B1 | 6/2003 | Wergen et al. | | 345/156 |
| 6,580,415 B1 | 6/2003 | Kato et al. | | 345/156 |
| 6,587,573 B1 | 7/2003 | Stam et al. | | 382/104 |
| 6,593,956 B1 | 7/2003 | Potts et al. | | 348/14.09 |
| 6,621,938 B1 | 9/2003 | Tanaka et al. | | 382/276 |
| 6,628,265 B2 | 9/2003 | Hwang | | 345/156 |
| 6,661,914 B2 | 12/2003 | Dufour | | 382/154 |
| 6,674,415 B2 | 1/2004 | Nakamura et al. | | 345/32 |
| 6,676,522 B2 | 1/2004 | Rowe et al. | | 463/42 |
| 6,677,967 B2 | 1/2004 | Swano et al. | | 715/839 |
| 6,677,987 B1 | 1/2004 | Girod | | 348/171 |
| 6,709,108 B2 | 3/2004 | Levine et al. | | 351/211 |
| 6,720,949 B1 | 4/2004 | Pryor et al. | | 345/158 |
| 6,727,988 B2 | 4/2004 | Kim et al. | | 356/319 |
| 6,741,741 B2 | 5/2004 | Farrell | | 382/199 |
| 6,746,124 B2 | 6/2004 | Fischer et al. | | 353/43 |
| 6,751,338 B1 | 6/2004 | Wallack | | 382/106 |
| 6,753,849 B1 | 6/2004 | Curran et al. | | 345/158 |
| 6,767,282 B2 | 7/2004 | Matsuyama et al. | | 463/3 |
| 6,769,769 B2 | 8/2004 | Podlleanu et al. | | 351/221 |
| 6,772,057 B2 | 8/2004 | Breed et al. | | 701/45 |
| 6,774,939 B1 | 8/2004 | Peng | | 348/231.4 |
| 6,785,329 B1 | 8/2004 | Pan et al. | | 375/240.08 |
| 6,789,967 B1 | 9/2004 | Forester | | 400/489 |
| 6,791,531 B1 | 9/2004 | Johnston et al. | | 345/157 |
| 6,795,068 B1 | 9/2004 | Marks | | 345/419 |
| 6,809,776 B1 | 10/2004 | Simpson et al. | | 348/565 |
| 6,819,318 B1 | 11/2004 | Geng | | 345/420 |
| 6,847,311 B2 | 1/2005 | Li | | 341/28 |
| 6,863,609 B2 | 3/2005 | Okuda et al. | | 463/36 |

(56) References Cited

U.S. PATENT DOCUMENTS

| | | | |
|---|---|---|---|
| 6,881,147 B2 | 4/2005 | Naghi et al. | 463/35 |
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,930,725 B1 | 8/2005 | Hayashi | 348/373 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,951,515 B2 | 10/2005 | Ohshima et al. | 463/31 |
| 6,952,198 B2 | 10/2005 | Hansen | 345/158 |
| 6,965,362 B1 | 11/2005 | Ishizuka | 345/82 |
| 6,970,183 B1 | 11/2005 | Monroe | 348/143 |
| 6,990,639 B2 | 1/2006 | Wilson | 715/863 |
| 7,006,009 B2 | 2/2006 | Newman | 340/854.5 |
| 7,016,411 B2 | 3/2006 | Azuma et al. | 375/240.08 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,043,056 B2 | 5/2006 | Edwards et al. | 382/103 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 | 7/2006 | Marks | 345/156 |
| 7,090,352 B2 | 8/2006 | Kobor et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,116,330 B2 | 10/2006 | Marshall et al. | 345/474 |
| 7,116,342 B2 | 10/2006 | Dengler et al. | 345/630 |
| 7,121,946 B2 | 10/2006 | Paul et al. | 463/36 |
| 7,130,454 B1* | 10/2006 | Berube et al. | 382/118 |
| 7,139,767 B1 | 11/2006 | Taylor et al. | 707/102 |
| 7,148,922 B2 | 12/2006 | Shimada | 348/370 |
| 7,164,413 B2 | 1/2007 | Davis et al. | 345/163 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 | 6/2007 | Hildreth et al. | 345/156 |
| 7,227,976 B1 | 6/2007 | Jung et al. | 382/103 |
| 7,245,273 B2 | 7/2007 | Eberl et al. | 351/211 |
| 7,259,375 B2 | 8/2007 | Tichit et al. | 250/341.8 |
| 7,263,462 B2 | 8/2007 | Funge et al. | 702/179 |
| 7,274,305 B1 | 9/2007 | Lutrell | 340/870.02 |
| 7,283,679 B2 | 10/2007 | Okada et al. | 382/260 |
| 7,296,007 B1 | 11/2007 | Funge et al. | 706/47 |
| 7,301,530 B2 | 11/2007 | Lee et al. | 345/158 |
| 7,305,114 B2 | 12/2007 | Wolff et al. | 709/200 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 | 5/2008 | Wallace et al. | 382/100 |
| 7,391,409 B2 | 6/2008 | Zalewski et al. | 345/156 |
| 7,436,887 B2 | 10/2008 | Yeredor et al. | 375/240 |
| 7,446,650 B2 | 11/2008 | Schofield et al. | 340/425.5 |
| 7,545,926 B2 | 6/2009 | Mao | 379/406.08 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,636,697 B1 | 12/2009 | Dobson et al. | 706/12 |
| 7,636,701 B2 | 12/2009 | Funge et al. | 706/47 |
| 7,697,700 B2 | 4/2010 | Mao | 381/94.3 |
| 7,721,231 B2 | 5/2010 | Wilson | 715/863 |
| 7,834,846 B1 | 11/2010 | Bell | 345/156 |
| 8,411,149 B2 | 4/2013 | Maison et al. | 348/207.1 |
| 2001/0056477 A1 | 12/2001 | McTernan et al. | 709/219 |
| 2002/0010655 A1 | 1/2002 | Kjallstrom | 705/27 |
| 2002/0022521 A1 | 2/2002 | Idaka | 463/42 |
| 2002/0056114 A1 | 5/2002 | Fillebrown et al. | 725/78 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0126899 A1 | 9/2002 | Farrell | 382/199 |
| 2002/0134151 A1 | 9/2002 | Naruoka et al. | 73/291 |
| 2002/0158873 A1 | 10/2002 | Williamson | 345/427 |
| 2002/0186221 A1 | 12/2002 | Bell | 345/474 |
| 2003/0014212 A1 | 1/2003 | Ralston et al. | 702/150 |
| 2003/0022716 A1 | 1/2003 | Park et al. | 463/36 |
| 2003/0093591 A1 | 5/2003 | Hohl | 710/22 |
| 2003/0100363 A1 | 5/2003 | Ali | 463/30 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0178576 A1 | 9/2004 | Hillis et al. | 273/148 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0059488 A1 | 3/2005 | Larsen | 463/36 |
| 2005/0077470 A1 | 4/2005 | Tichit et al. | 250/341.8 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Koslowski et al. | 382/115 |
| 2005/0117045 A1 | 6/2005 | Abdellatif et al. | 384/335 |
| 2005/0198095 A1 | 9/2005 | Du et al. | 709/200 |
| 2005/0226431 A1 | 10/2005 | Mao | 381/61 |
| 2005/0239548 A1 | 10/2005 | Ueshima et al. | 463/36 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0250681 A1 | 11/2006 | Zalewski et al. | 345/156 |
| 2006/0251298 A1* | 11/2006 | Bronstein et al. | 382/118 |
| 2006/0252541 A1 | 11/2006 | Zalewski et al. | 463/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2006/0288234 A1* | 12/2006 | Azar et al. | 713/186 |
| 2007/0015559 A1 | 1/2007 | Zalewski et al. | 463/1 |
| 2007/0021208 A1 | 1/2007 | Mao et al. | 463/36 |
| 2007/0025562 A1 | 2/2007 | Zalewski et al. | 381/92 |
| 2007/0060336 A1 | 3/2007 | Marks et al. | 463/30 |
| 2007/0061413 A1 | 3/2007 | Larsen et al. | 709/217 |
| 2007/0066394 A1 | 3/2007 | Ikeda et al. | 463/37 |
| 2007/0072675 A1 | 3/2007 | Hammano et al. | 463/42 |
| 2007/0079137 A1 | 4/2007 | Tu | 713/186 |
| 2007/0120834 A1 | 5/2007 | Boillot | 354/103 |
| 2007/0120996 A1 | 5/2007 | Boillot | 384/345 |
| 2007/0260340 A1 | 11/2007 | Mao | 700/94 |
| 2007/0260517 A1 | 11/2007 | Zalewski et al. | 705/14 |
| 2007/0261077 A1 | 11/2007 | Zalewski et al. | 725/35 |
| 2008/0056561 A1 | 3/2008 | Sawachi | 382/154 |
| 2008/0070684 A1 | 3/2008 | Haigh-Hutchinson | 463/32 |
| 2008/0091421 A1 | 4/2008 | Gustavsson | 704/233 |
| 2009/0010494 A1 | 1/2009 | Bechtel et al. | 382/104 |
| 2009/0016642 A1 | 1/2009 | Hart | 382/278 |
| 2009/0221368 A1 | 9/2009 | Yen et al. | 463/32 |

(56) References Cited

U.S. PATENT DOCUMENTS

| | | | |
|---|---|---|---|
| 2009/0221374 A1 | 9/2009 | Yen et al. | 463/42 |
| 2009/0244309 A1 | 10/2009 | Maison et al. | 348/222.1 |
| 2009/0288064 A1 | 11/2009 | Yen et al. | 717/106 |
| 2010/0004896 A1 | 1/2010 | Yen et al. | 702/153 |
| 2010/0137064 A1 | 6/2010 | Shum et al. | 463/36 |
| 2010/0194741 A1* | 8/2010 | Finocchio | 345/419 |
| 2011/0090149 A1 | 4/2011 | Larsen et al. | 345/158 |
| 2012/0240223 A1 | 9/2012 | Tu | 726/19 |
| 2013/0190086 A1 | 7/2013 | Maison et al. | 463/31 |

FOREIGN PATENT DOCUMENTS

| | | | | |
|---|---|---|---|---|
| EP | 0 750202 A | 12/1996 | | G01S 17/00 |
| EP | 0750202 | 12/1996 | | G01S 17/00 |
| EP | 0835676 | 4/1998 | | A63F 9/22 |
| EP | 1098686 | 5/2003 | | A63F 13/04 |
| EP | 1435258 | 7/2004 | | A63F 13/04 |
| FR | 2814965 | 4/2002 | | A63H 30/00 |
| GB | 2206716 | 1/1989 | | G06K 7/12 |
| GB | 2206716 | 11/1989 | | G06K 7/12 |
| GB | 2376397 | 11/2002 | | G06F 3/00 |
| GB | 2388418 | 11/2003 | | G06F 3/033 |
| JP | 01-284897 | 11/1989 | | G10H 1/34 |
| JP | 06-102980 | 4/1994 | | G06F 3/02 |
| JP | 07-311568 | 11/1995 | | G09G 5/02 |
| JP | 9-128141 | 5/1997 | | G06F 3/033 |
| JP | 9-185456 | 7/1997 | | G06F 3/033 |
| JP | 11-38949 | 2/1999 | | G09G 5/00 |
| JP | 2000-172431 | 6/2000 | | G06F 3/033 |
| JP | 2000259856 | 9/2000 | | G06T 17/00 |
| JP | 2000350859 | 12/2000 | | A63F 13/00 |
| JP | 2001-166676 | 6/2001 | | G09B 9/00 |
| JP | 2002369969 | 12/2002 | | A63F 13/12 |
| JP | 2004-145448 | 5/2004 | | G06T 17/40 |
| JP | 2004145448 | 5/2004 | | G06T 17/40 |
| JP | 2005-046422 | 2/2005 | | A63F 13/06 |
| WO | WO 88/05942 | 8/1988 | | G06F 3/033 |
| WO | WO 98/48571 | 10/1998 | | H04N 5/45 |
| WO | WO 99/35633 | 7/1999 | | |
| WO | WO 99/26198 | 10/1999 | | |
| WO | WO 02/27456 | 2/2002 | | G06F 3/00 |
| WO | WO 03/079179 | 9/2003 | | G06F 3/033 |
| WO | WO 2005/073838 | 8/2005 | | G06F 3/033 |
| WO | WO 2005107911 | 11/2005 | | A63F 13/06 |
| WO | WO 2007095082 | 8/2007 | | |
| WO | WO 2008/056180 | 5/2008 | | G01B 11/02 |

OTHER PUBLICATIONS

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Iddan, et al., "3D Imaging in the Studio (And Elsewhere . . . )", Proceedings of the SPIE, SPIE, Bellingham, VA, US, vol. 4298, Jan. 24, 2001, pp. 48-55, XP008005351.

Jojic, et al., "Tracking Self-Occluding Articulated Objects in Dense Disparity Maps", Computer Vision, 1999, The Proceedings fo the Seventh IEEE International Conference on Kerkyra, Greece Sep. 20-27, 1999, Los Alamitos, CA, US, IEEE Computer Society, US, Sep. 20, 1999, pp. 123-130.

Klinker, et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

Nakagawa, et al., "A Collision Detection and Motion Image Synthesis Between a Background Image and a Foreground 3-Dimensional Object", TVRSJ Bol. 4, No. 2, pp. 425-430, 1999, Japan.

Mihara, et al., "A Realtime Vision-Based Interface Using Motion Processor and Applications to Robotics", vol. J84-D-11, No. 9, pp. 2070-2078, Sep. 2001, Japan.

Nakamura, et al., "A Consideration on Reconstructing 3-D Model Using Object Views", 2004-01601-003, pp. 17-21, Kokkaido University, Japan, nakamura@media.eng.hokudai.ac.jp.

Nishida, et al., "A Method of Estimating Human Shapes by Fitting the Standard Human Model to Partial Measured Data", D-II vol. J84-D-II, No. 7, pp. 1310-1318, Jul. 2001.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A 0R6.

Hemmi, et al., "3-D Natural Interactive Interface-Using Marker Tracking from a Single View",Sep. 9, 1991, Systems and Computers in Japan.

Lanier, Jaron, "Virtually there: three-dimensional tele-immersion may eventually bring the world to your desk", Scientific American, ISSN: 0036-8733, Year: 2001.

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Kanade, et al., "A Stereo Machine for Video-rate Dense Depth Mapping and Its New Application" 1996, CVPR 96, IEEE Computer Society Conference, pp. 196-202 (022).

Gvili, et al., "Depth Keying", SPIE vol. 5006 (2003), 2003 SPIE-IS &T, pp. 564-574 (031).

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

Bronstein et al., *Three-Dimensional Face Recognition:, Intl Journal of Computer Vision, Kluwer* Academic Publishers, 80, vol. 64, No. 1, Aug. 1, 2005, XP019216473, ISSN: 1573-1405, DOI: 10.1007/S11263-005-1085-Y, p. 7, col. 2-p. 8, col. 1.

* cited by examiner

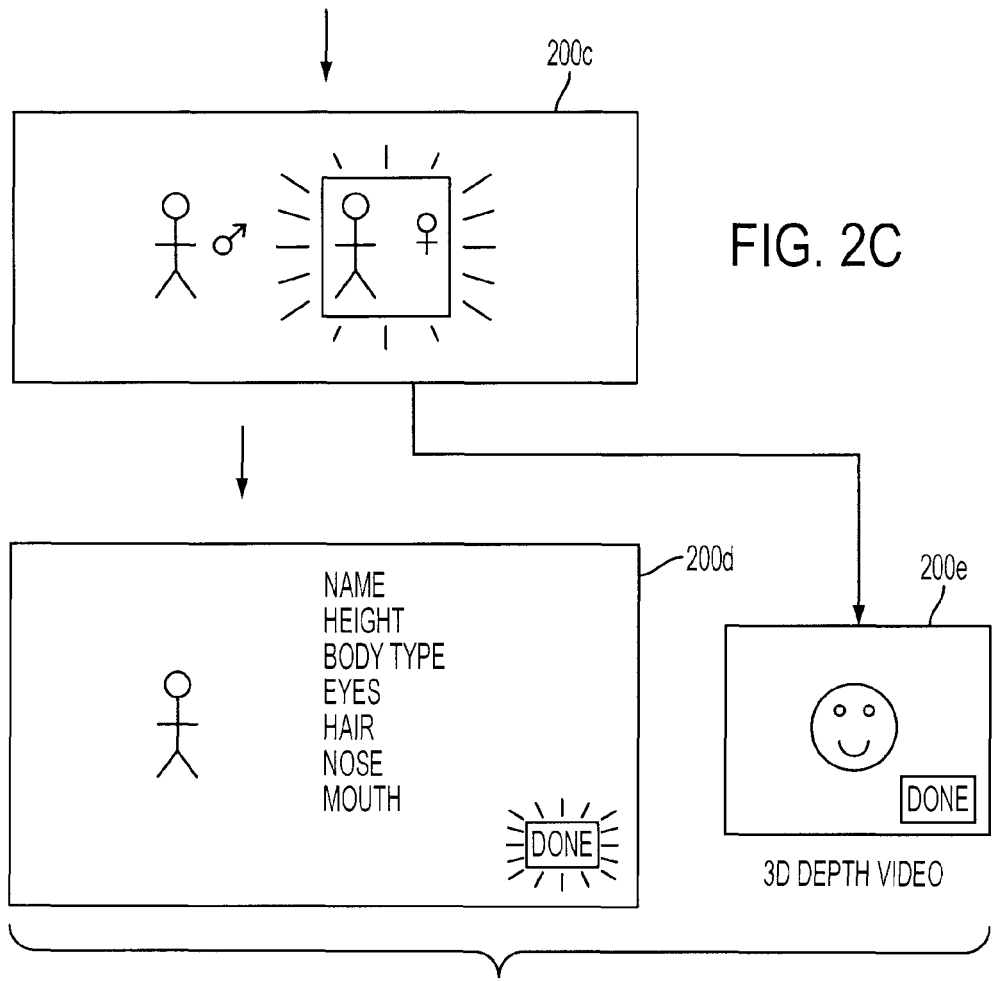
FIG. 2C
FIG. 2D
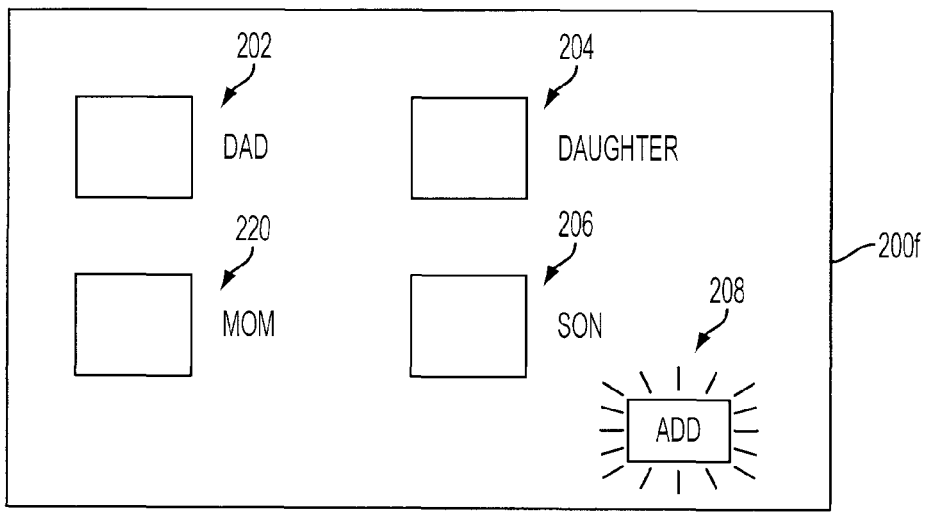
FIG. 2E

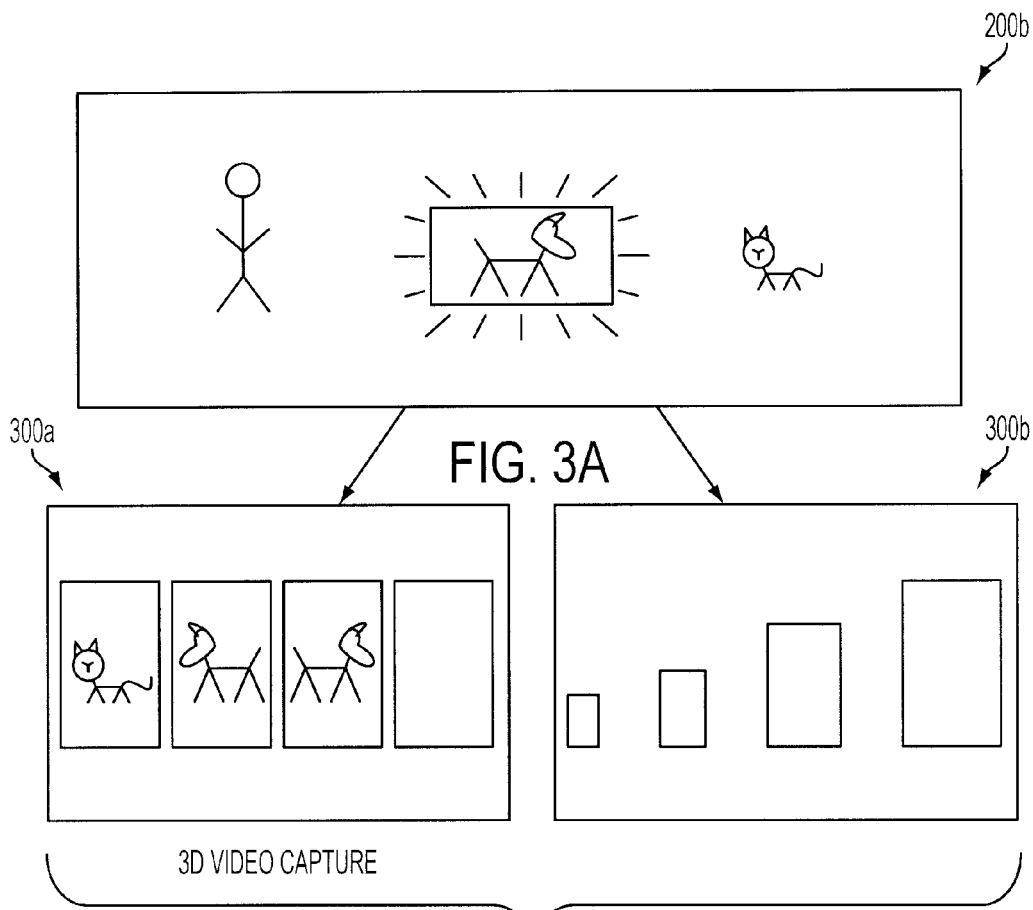
FIG. 3A
FIG. 3B
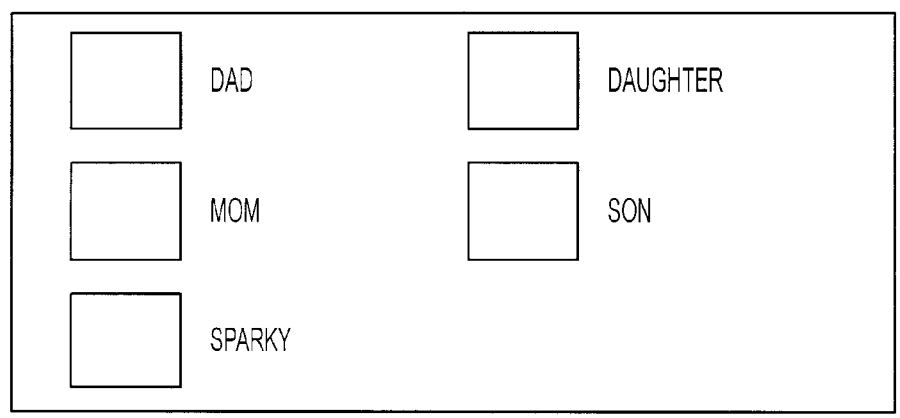
FIG. 3C

METHODS FOR CAPTURING DEPTH DATA OF A SCENE AND APPLYING COMPUTER ACTIONS

CLAIM OF PRIORITY

The present application claims priority from Provisional Application No. 61/032,028, entitled "METHODS FOR CAPTURING DEPTH DATA OF A SCENE AND APPLYING COMPUTER ACTIONS", filed on Feb. 27, 2008, which is herein incorporated by reference.

BACKGROUND OF THE INVENTION

Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation, Sony Playstation2 (PS2), and Sony Playstation3 (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet.

Game consoles connected to the Internet with increasing processing power are beginning to function as entertainment portals capable of providing access to online interaction and online marketplaces supplying streaming and downloadable media. In an online environment, parents can often struggle with effective and efficient parental controls. Piecemeal implementation of parental controls can result in ineffective, overzealous, or partial implementation creating gaps in parental controls. For example, where a cable box may provide parental control for television channels, separate parental controls may be required for videos stored on optical media such DVDs or Blu-Ray discs.

It is within this context that embodiments of the invention arise.

SUMMARY

Broadly speaking, the present invention enables users to be identified and tracked within a scene using a depth-sensing camera. The identification and tracking of users can enable automatic application of access controls to a variety of media sources based on the identified and tracked users within the scene. Users can configure the access controls as part of a user profile. A user can also configure an avatar as part of their user profile along with avatar animations. The avatar animations can be used to display user movement within and across the scene.

In one embodiment, a computer-implemented method to automatically apply predefined privileges for identified and tracked users in a space having one or more media sources is disclosed. The method includes an operation to define and save to memory, a user profile. The user profile may include data that identifies and tracks a user with a depth-sensing camera. In another operation privileges that define levels of access to particular media for the user profile are defined and saved. The method also includes an operation to capture image and depth data from the depth-sensing camera of a scene within the space. In yet another operation, the user is tracked and identified within the scene from the image and depth data. In still another operation the defined privileges are automatically applied to one or more media sources, so that the user is granted access to selected content from the one or more media sources when identified and tracked within the scene.

In another embodiment, a computer-implemented method for identifying and tracking real-world objects to automatically apply predefined computer-generated effects to virtual world representations of the real world objects is disclosed. The method includes an operation to define and save to memory a user profile that includes data to identify and track the user with a depth-sensing camera. The method also includes an operation to define and save to the memory animations that are integrated into a virtual world scene associated with the user profile. In another operation the depth-sensing camera captures a scene where the user is identified and tracked within the scene. In yet another operation, the defined animations are automatically applied based on the identified and tracked user, so that a display screen shows the integrated animations.

In yet another embodiment a computer implemented method for identifying and tracking a real-world users within a real-world space is disclosed. In one operation a user profile is defined from image and depth data captured by a depth-sensing camera. The user profile may include image and depth data related to physical characteristics of the real-world user. In another operation image and depth data may be captured for a scene using the depth-sensing camera. The method may also include an operation that identifies moving objects within the scene. In another operation, image and depth data for the moving objects allows a head of the real-world user to be locked onto and tracked within the scene. In yet another operation the image and depth data for the head is analyzed in real-time. The analysis can include comparing image and depth data for the head to user profile image and depth data related to physical characteristics, wherein a user is identified when image and depth data within the user profile substantially matches image and depth data for the head.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIGS. 2A-2D illustrate exemplary screen that can be used to define a user profile, in accordance with one embodiment of the present invention.

FIG. 2E is an exemplary screen illustrating completion of adding an additional user mom, in accordance with one embodiment of the present invention.

FIG. 2F-2 illustrates capturing image and depth data of a user head 250 in a variety of position, in accordance with one embodiment of the present invention.

FIGS. 3A-3C show an abbreviated set of exemplary screen that can be used to create a user profile for a pet, in accordance with one embodiment of the present invention.

DETAILED DESCRIPTION

An invention is disclosed for automatically applying user profiles for a computer system after a user is identified with image and depth data from a depth-sensing camera. Broadly speaking, the computer system can be any type of system that takes input from a user, whether it be a general purpose computer (e.g., desktop, notebook, handheld device, smartphone, etc.), or a special purpose computer like a game console. The depth-sensing camera is can capture geometric depth data along image data. The depth-sensing camera can provide image and depth data to the computer system for analysis and processing. In one embodiment, the depth-sensing camera is a single lens camera, and in other embodiments, multiple camera lenses can be used to capture images and depth data from various locations or perspectives.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1A:
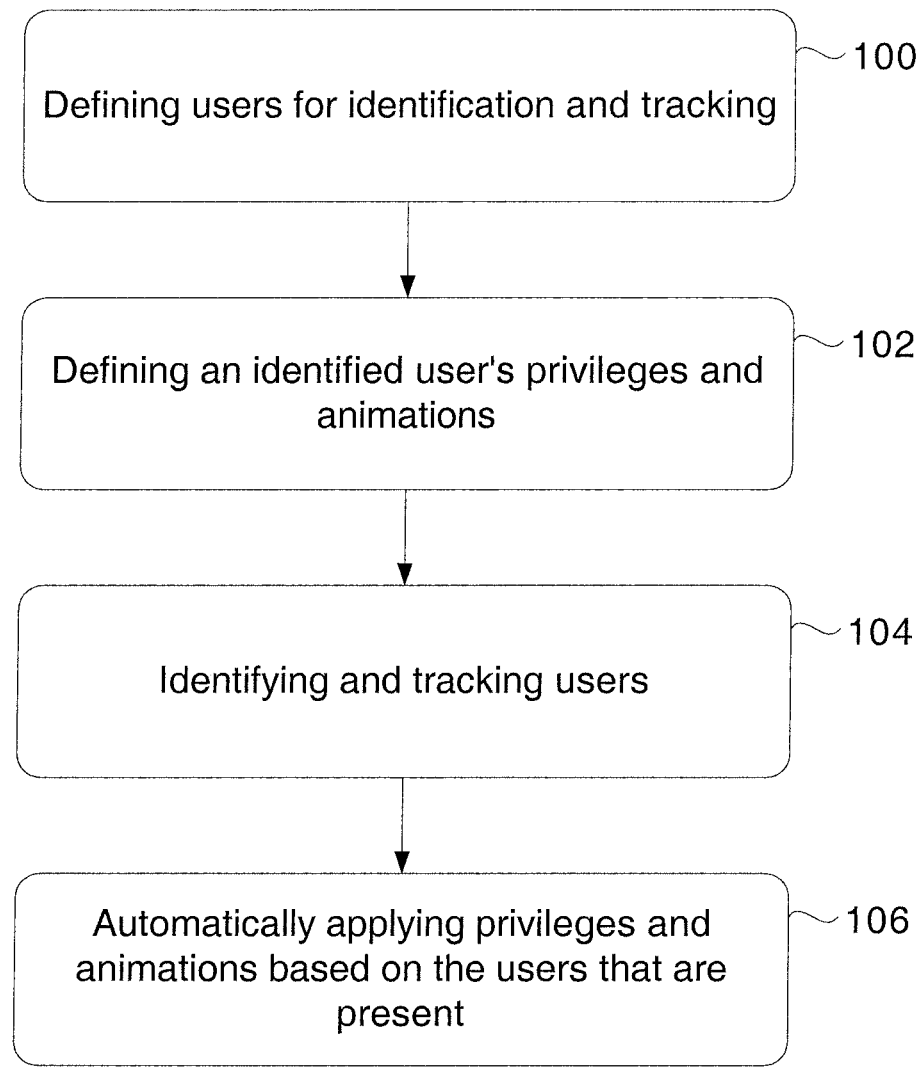
FIG. 1A is a flow chart including exemplary operations that can be used to identify and track real world objects in order to apply pre-defined computer generated effects to virtual world representations of the real-world objects, in accordance with one embodiment of the present invention.

FIG. 1A is a flow chart including exemplary operations that can be used to identify and track real world objects in order to apply pre-defined computer generated effects to virtual world representations of the real-world objects, in accordance with one embodiment of the present invention. Operation 100 is used to define a user for identification and tracking. In one embodiment, operation 100 is performed using a depth-sensing camera connected to a computer system. The users can be distinguished by individual characteristics captured by the depth-sensing camera and recognized by software executed by the computer system. In various embodiments, facial characteristics including, but not limited to various distances between facial features such as eyes, nose, and mouth can be captured. In other embodiments, the depth-sensing features of the camera can be used to recognize features of a user, such as the nose, eyes, head size, relative positions of features, etc. of a user.

Users can also define virtual world avatars as part of operation 100. As part of defining a user for identification and tracking, the user can configure a customized avatar that is representative of the user within a virtual world. A user can configure their avatar to be similar to their real-world appearance or choose to have a fanciful avatar not bound by their real-world appearance. To that end, avatars can include, but are not limited to configurations for size and shape of bodies, heads, eyes, noses, ears, mouths, arms, legs, and hair. Users can also be allowed to configure virtual clothing and footwear for their avatar along with fashion accessories such as jewelry and sunglasses.

Operation 102 is used to define privileges and animations for identified users. The privileges allow restrictions to be placed on the type of content accessible via the computer system when an identified user is in front of the depth-sensing camera. In one embodiment, the computer system is connected to the internet and provides access to various media sources such as, but not limited to, streaming or downloadable music and multimedia such as movies, television shows, and video clips. Additionally, the computer system can provide access to online or downloadable games along with providing a web browser for accessing websites capable of streaming video such as YouTube. The computer system can also include an integrated media source that is capable of playing DVDs or other optical storage media such as Blu-Ray or HD-DVD discs. Privileges assigned to defined users can restrict access to particular types of movies, television shows, games and websites.

Operation 102 can also be used to define animations for identified users. The animations can be used to animate an identified user's avatar on the screen in response to real-world actions detected by the depth-sensing camera and the computer system. For examples, in one embodiment, when the speed of movements for a user crosses a threshold velocity, an animation can be applied to the user's avatar. In one embodiment slow movement from a user can result in cobwebs or spider webs being animated on the user's virtual world avatar. In another embodiment, rapid movement from the user can result in animations emphasizing the user's high rate of speed such as blurring the avatar or other animations such as motion clouds or sound effects. The user avatar along with the defined privileges and animations can be saved for recall when the depth-sensing camera and the computer system recognize the identified user.

Operation 104 can be used to identify and track moving objects that enter the field of view of the depth-sensing camera. If the object moving within the field of view of the camera is recognized as a defined user, operation 106 can automatically apply the privileges and/or animations. In situations where the moving object is not recognized as a defined user, operation 106 can automatically load default privileges and/or animations. Operation 104 can also utilize the computer system and depth-sensing camera to track and animate movements of recognized or unrecognized user over time. In one embodiment, when the depth-sensing camera identifies movement, it can begin creating a log file of the movement over time. In embodiments, when an identified user enters the field of view of the depth-sensing camera, a log file is created using the preset animation for the user. The log file can be played back showing the identified users movement within the field of view of the depth-sensing camera over time.

Figure 1B:
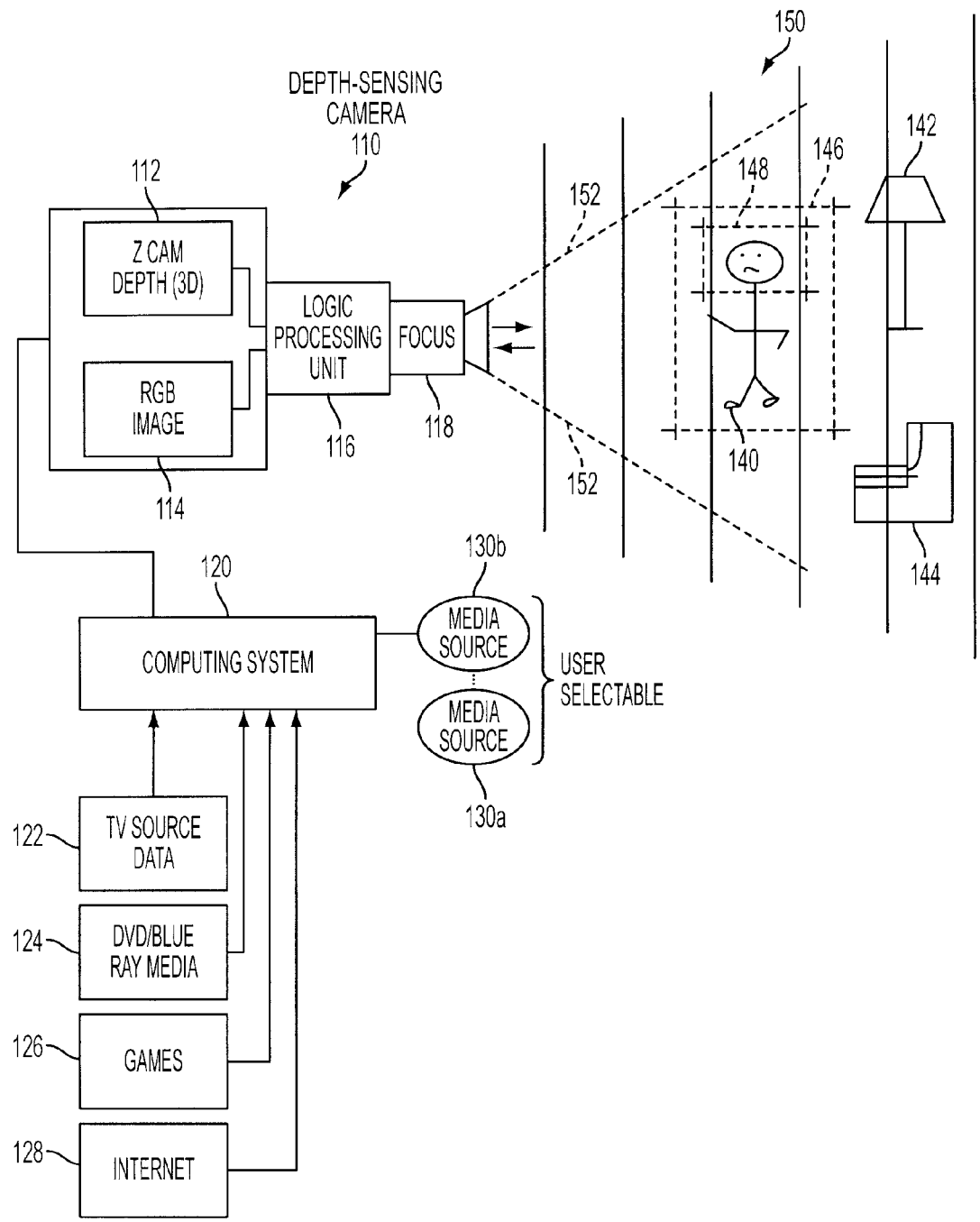
FIG. 1B shows a scene within the a field of view of a depth-sensing camera that is connected to a computer system, in accordance with one embodiment of the present invention.

FIG. 1B shows a scene 150 within the a field of view 152 of a depth-sensing camera 110 that is connected to a computer system 120, in accordance with one embodiment of the present invention. The depth-sensing camera 110 can capture image data using an RGB image module 114 while the depth data module 112 can capture relative depth data for objects within its field of view 152. In one embodiment, the depth-sensing camera 110 can determine relative depths based on an amount of light reflected off of three-dimensional objects. In some embodiments, the depth-sensing camera includes an array of infrared Light Emitting Diodes (LEDs) capable of pulsing infrared light. The depth data module 112 can determine relative depth of objects within its field of view of based on the amount of pulsed infrared light that is reflected back into the depth-sensing camera 110. In other embodiments, image and depth data from the depth-sensing camera 110 is sent to the computer system 120 for processing.

A focusing module 118 can be included with the depth-sensing camera 110 along with a logic processing unit 116. In some embodiments, the logic processing unit 116 can be used to correlate data from the RGB image module 114 and the depth data module 112. In other embodiments, the logic processing unit 116 can assist in controlling the focusing module 118. The focusing module 118 can change the focus of the RGB image module 114 and the focus of the depth data module 112. Augmenting the intensity and duration of individual infrared LEDs within the infrared LED array can change the focus of the depth data module 112. The image and depth data captured by the depth-sensing camera can be processed in substantially real-time by the computer system 120.

In addition to accepting and processing image and depth data from the depth-sensing camera 110, the computer system 120 can include or accept input from a variety of other sources. For example, TV source 122, DVD/Blu-Ray media 124, games 126 and the Internet 128 can be accessed through the computer system 120. Users can select different media sources 130a/b via a user-interface for the computer system 120.

The scene 150 includes a user 140, a lamp 142 and a sofa 144. The computer system 120 can distinguish the user 140 from stationary objects such as the lamp 142 and the sofa 144. Responding to commands from the computer system 120, the depth-sensing camera 110 can focus on an area 146 around the user 140. In an effort to identify the user 140, the depth-sensing camera 110 can refine its focus to a head area 148 of the user 140. Focusing on the head area 148 can allow the depth-sensing camera to capture image and depth data for the user 140 that can be analyzed and compared to profile data associated with the computer system 120.

Figure 2A:
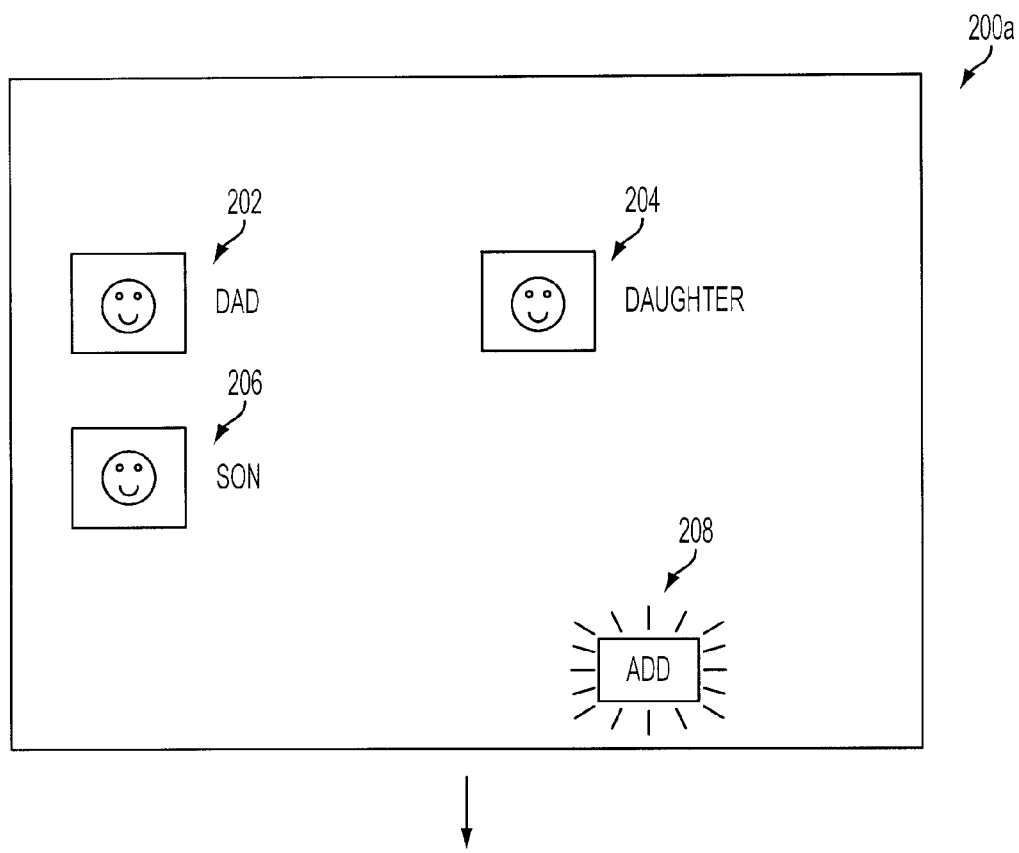
Figure 2B:
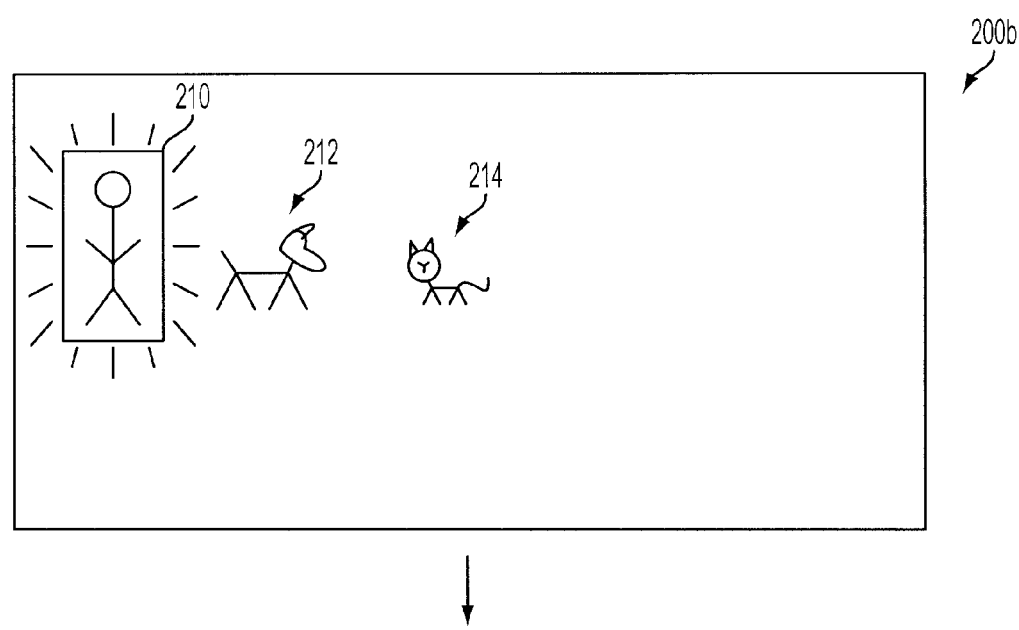

FIGS. 2A-2D illustrate exemplary screen that can be used to define a user profile, including an avatar, in accordance with one embodiment of the present invention. FIG. 2A shows an exemplary screen 200 for the computer system where user profiles for dad 202, daughter 204 and son 206 have already been created. Also shown on the screen 200 is button 208 that allows a new user profile to be created. FIG. 2B illustrates an exemplary screen 200b as a result of selecting button 208, in accordance with one embodiment of the present invention. Screen 200b displays different types of user profiles that can be created for one embodiment of the present invention. For example, profiles based on people can be created by selection human icon 210. In embodiments where a user wishes to track the movement of pets within a room, selecting dog icon 212 or cat icon 214 can create dog or cat profiles. Additional types of profiles can be included and those listed should not be construed as limiting.

FIG. 2C shows a representative screen 200c as a result of selecting human icon 210 in accordance with one embodiment of the present invention. Screen 200c allows a user to select between a male icon 216 or a female icon 218. In this example, the user chooses female icon 218. FIG. 2D illustrates two different screens 200d/e for configuring an avatar in accordance with various embodiments of the present invention. Screen 200d illustrates a menu system that could be used to configure an avatar. As illustrated, the menu system can include selections for name, height, body type, eyes, hair, nose and mouth. As should be understood by those skilled in the art, each menu selection shown on screen 200d can call up another screen or sub-menu that allows users finer granularity for configuring an avatar.

Screen 200e illustrates an alternative avatar customization screen in accordance with one embodiment of the present invention. Using the alternative avatar customization the depth-sensing camera can be used to capture images of the user. The captured images of the user can then be processed by the computer system to automatically create an avatar based on the capture images of the user. In some embodiments, the automatically created avatar is a baseline avatar where the user can modify features of the automatically created avatar. In both embodiments, a user can customize or tweak the self-created or automatically created avatar with clothing or fashion accessories.

FIG. 2E is an exemplary screen 200f illustrating completion of adding an additional user mom 220, in accordance with one embodiment of the present invention. Screen 200f is the result of completing the creation of the mom 220 user profile as described in FIGS. 2A-2D. This results in the screen 200f showing user profiles for dad 202, daughter 204, son 206 and mom 220. FIG. 2E also illustrates button 208 being selected to add another user profile.

Figures 1, 2F:
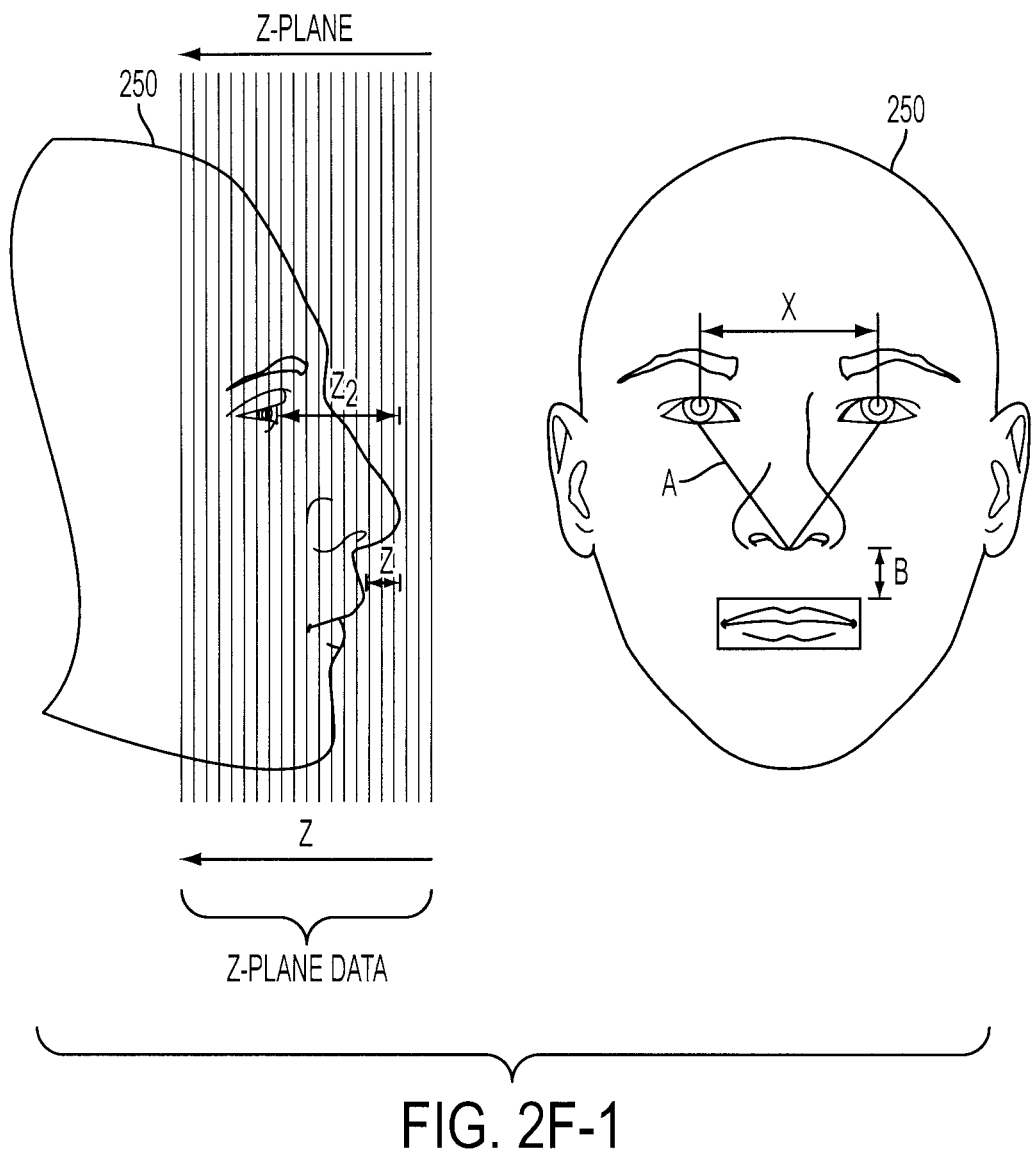
FIG. 2F-1 illustrates facial features captured by the depth-sensing camera that can be used to recognize users in accordance with one embodiment of the present invention.

FIG. 2F-1 illustrates facial features captured by the depth-sensing camera that can be used to recognize users in accordance with one embodiment of the present invention. During the configuration of a user's avatar, the depth-sensing camera can be used to capture images and depth data of a user's head 250 and facial features. The images and associated depth data can be analyzed by the computer system for identifying characteristics that will allow the computer system to recognize the user.

Various identifying characteristics can be used including, but not limited to distances between facial features, relative sizes of facial features and relative location of facial features. In other embodiments, features on the user's head can be identified such as the relative location and size of ears. For example, depth data, shown in FIG. 2F as distances in the Z-plane, can be used to determine and recognize $Z_1$, the distance between the tip of a user's nose and the user's upper lip. Depth data can also be used to determine and recognize $Z_2$, the distance between the tip of a user's nose and their eyes. Similarly, image data can be used to recognize the distance between a user's eyes shown as distance X in FIG. 2F-1. Likewise, the distance B, between a user's nose and their mouth can be measured and used as an identifying characteristic. The image data and the associated depth data can determine ratios between depth data and measurements from image data in order to identify and recognize users.

Figures 2, 2F:
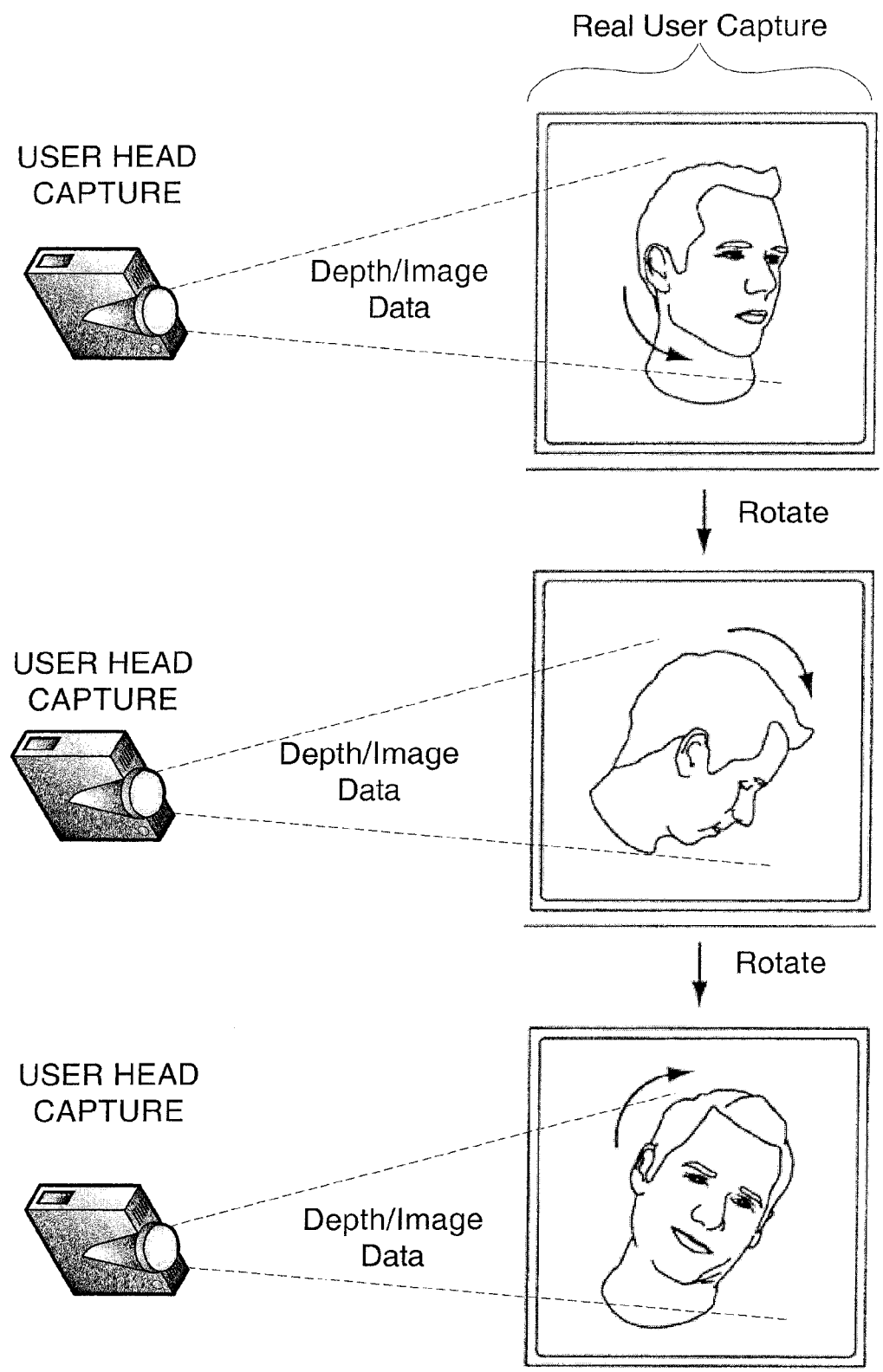

FIG. 2F-2 illustrates capturing image and depth data of a user head 250 in a variety of position, in accordance with one embodiment of the present invention. In some embodiments, when creating a user profile, the user can be prompted (e.g., by a GUI, voice/sound commands, or text) to turn or rotate their head into a variety of positions. This allows the depth-sensing camera to capture image and depth data for the user's entire head, or at least most of the front part of the head having the identifiable face features.

The computer system can analyze the image and depth data to create a wire-frame model of the user's head. In some embodiments, the wire frame model of the user's head can be used as part of the user's virtual-world avatar. As will be discussed in further detail below, the computer system can analyze the wire-frame model to determine user specific ratios between facial and head characteristics at a variety of angles. The specific facial features and measurement that have been discussed are intended to be exemplary and should not be considered limiting. The image and depth data can be analyzed for additional measurements that can be used for identifying and recognizing a user.

In other embodiments, the depth-sensing camera can be used to capture image and depth data of a user's entire body in various poses. Similar to facial recognition, the computer system can analyze the images and associated depth data to identify the user. As will be discussed in more detail with FIG. 8 and FIG. 9, stationary object within a scene can be recognized by the computer system and assist in identifying and tracking users by providing relative positioning of users within the scene.

Figure 2G:
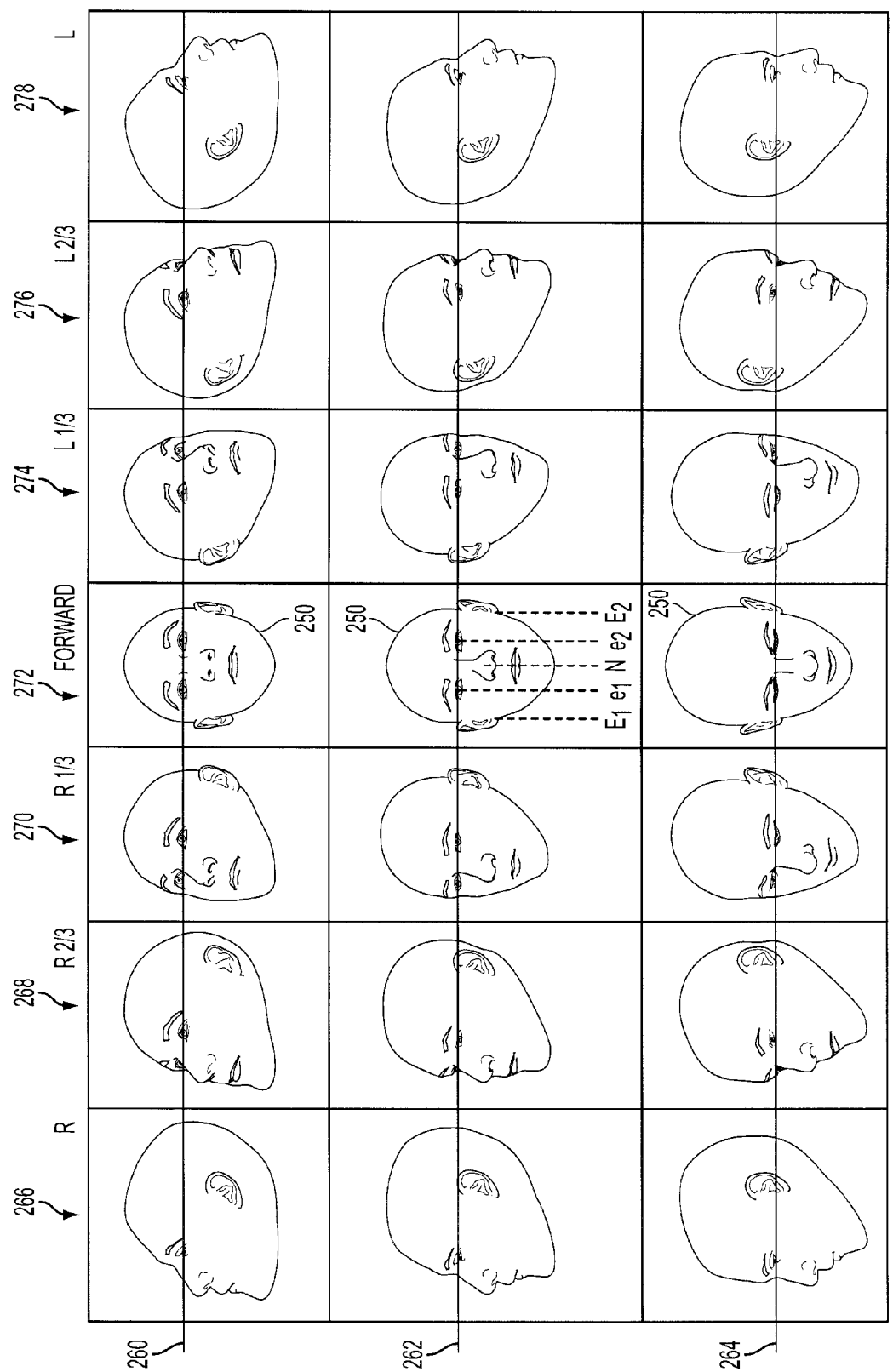
FIG. 2G illustrates a matrix of various poses of a modeled user's face 251 constructed from various views captured by the depth-sensing camera in accordance with one embodiment of the present invention.

FIG. 2G illustrates a matrix of various poses of a modeled user's face 251 constructed, at least in part, from various views captured by the depth-sensing camera in accordance with one embodiment of the present invention. In some cases, the constructed poses are generated by approximating dimensional and depth data (e.g., using the data captured in FIG. 2F-2).

When the system is in use or operation, the depth-sensing camera may not always obtain a straight forward view of a users because users can enter the field of view of the depth-sensing camera from a variety of angles. Thus, in order to identify and track a user, the computer system can use the wire-frame model of a user's head to extrapolate various ratios of facial and head characteristics for a user's head in a variety of positions.

Row 262 illustrates a sequence of images where the wire-frame model of the user's head is captured as if the user turned their head from right to left without tilting their head. Row 260 shows a similar sequence of images where the wire-frame model is positioned so the head is tilted backwards while in row 264, the wire-frame model is tilted forward. Column 272 shows the wire-frame model face forward for the respective rows while column 270 and column 274 show image data for the user in respective right and left one-third views to the depth-sensing camera. Similarly, column 268 and column 276 show the user in respective right and left two-thirds views while column 266 and column 278 show the user in respective right and left profile to the depth-sensing camera. The matrix illustrated in FIG. 2G has been simplified and should be considered exemplary. Real world embodiments can sample video images at various frame rates to compile more or less image and depth data for an individual user. As will be discussed below, in the different views of the user, the image and depth data can be analyzed for the relative location of various facial features. In one embodiment, a right ear $E_1$, right eye $e_1$, nose N, left eye $e_2$, and left ear $E_2$ can be identified and tracked from the image and depth data.

Figure 2H:
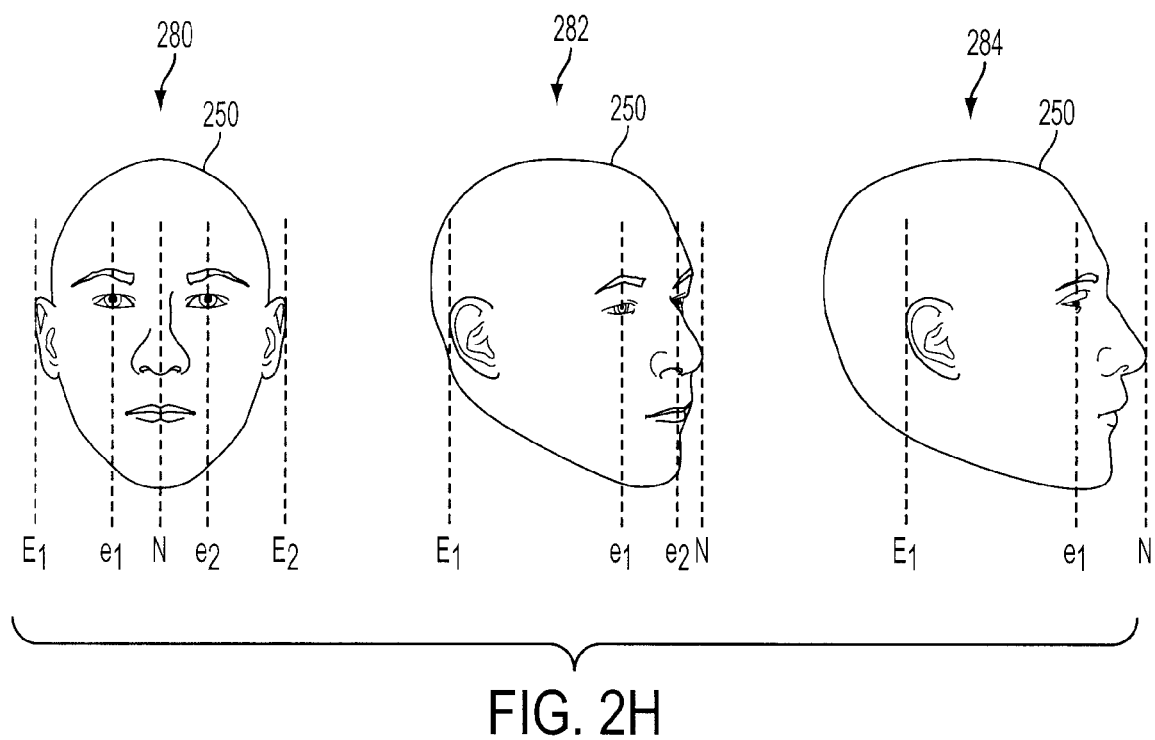
FIG. 2H is a sequence of three images showing changes in relative position of various facial features in accordance with one embodiment of the present invention.

FIG. 2H is a sequence of three images showing changes (e.g., delta values) in relative position of various facial features in accordance with one embodiment of the present invention. In profile 280 the user is directly facing the depth-sensing camera. From this angle, the position of the user's nose N can be determined relative to the position of the user's eyes $e_1$ and $e_2$, along with ears $E_1$ and $E_2$. On some users, the relative position of ears $E_1$ and $E_2$ may not be able to be determined in profile 280. In these instances, identification can be determine from the relative position of the user's eyes and nose. In order to identify a user, the relative position of the facial features and ears of the user can be compared to the matrix of wire-frame models. Should the user be identified, the computer system can automatically apply the appropriate user profile. Additionally, in some embodiments, the computer system can monitor image and depth data from the depth-sensing camera to monitor and track the position of the user's head. In still further embodiment, the image and depth data can also track eye movements of the user to determine where the user is looking within the space.

Profile 282 illustrates how rotating the user's head 250 to the left changes the relative position of facial features for the user. Comparing profile 280 and profile 282, the user's left ear $E_2$ is no longer visible to the depth-sensing camera while right ear $E_1$ is more visible. Likewise, left eye $e_2$ is now farther away from the depth-sensing camera and the aspect ratio between right eye $e_1$ and left eye $e_2$ has changed. From such real-time image and depth data, the computer system can attempt to match the user with a wire-frame models stored in memory. In profile 282, the depth-sensing camera data can indicate a depth position for left eye $e_2$. Simultaneously, image data captured by the depth-sensing camera can be analyzed and the relative size of the left eye $e_2$ can be determined. Similarly, the depth sensing camera can perceive changes in the user's nose N relative to right ear $E_1$, right eye $e_1$ and left eye $e_2$.

Profile 284 illustrates a left-profile view of the user having rotated their head. In this view, the depth-sensing camera captures the user's right ear $E_1$, right eye $e_1$ and nose N in full profile. The relative position of the facial features visible to the depth-sensing camera can be determined and used to identify and track the user from the matrix of wire-frame models. The profiles discussed in FIG. 2H should are simplified and should be considered exemplary. In some embodiments, multiple frames of image and depth data can be captured per second to create a range of facial feature ratios. The sampled range can then be compared to ranges of motion within the matrix of wire-frame models. As illustrated in FIG. 2H, the various ratios for facial positions can be tracked when a user turns their head from side-to-side. Similarly in other embodiments, different ratios can be used determine when a user tilts their head forward or backwards using horizontal lines to demarcate relative positions of a user's eyes, nose and mouth. As a user tilts their head forward or backwards, the relative distance between the horizontal lines as captured by the depth-sensing camera can be calculated to determine how far back or forward the head is tilted.

Figure 2I:
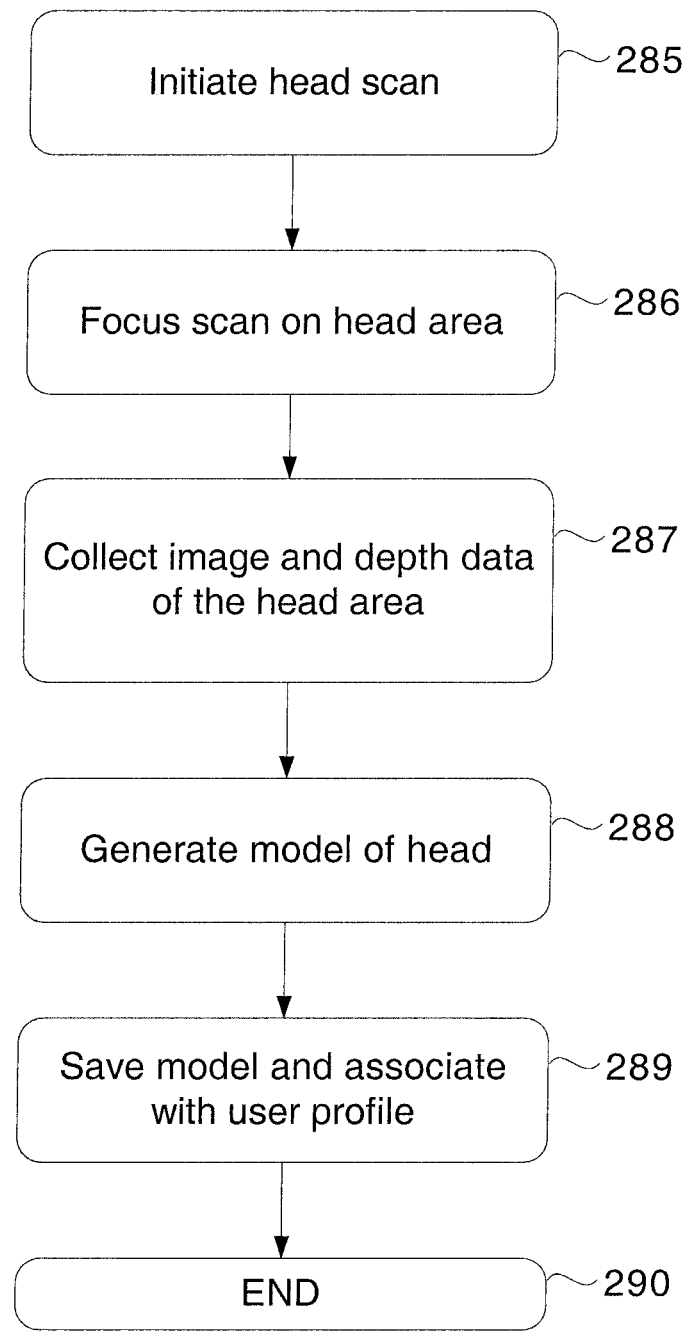
FIG. 2I is an exemplary flow chart illustrating a procedure to acquire image and depth data for a user's head in accordance with one embodiment of the present invention.

FIG. 2I is an exemplary flow chart illustrating a procedure to acquire image and depth data for a user's head in accordance with one embodiment of the present invention. The following operations can be used when a user profile is created or modified so the computer system can recognize the user at a future time. Operation 285 initiates a head scan of the user. This operation can be initiated when creating or modifying a user profile as in FIG. 2F-2. Operation 285 focuses the depth-sensing camera on a user's head area. In one embodiment, the user may be prompted to stand in a specific location relative to the depth-sensing camera. In another embodiment, the depth-sensing camera can shift the focus of the imaging and depth sensing elements toward the user. If multiple people are present in front of the depth-sensing camera, the user may be prompted to select which person is going to be scanned using an on-screen display.

Operation 287 is used to collect image and depth data of the head area. As previously discussed, this operation can prompt the user to turn their head in a variety of directions. This can allow the depth-sensing camera to capture the user's head in a variety of positions. Operation 288 generates a model of the user's head based on the image and depth data. In one embodiment, the depth data can be used to construct a three-dimensional wire-frame model of the user's head. The computer program can determine relative positions of various facial features and head features can using the wire-frame model. The positional data along with the model can be saved and associated with the user profile in operation 289. END operation 290 completes the flow chart, although other operations may follow.

Figure 2J:
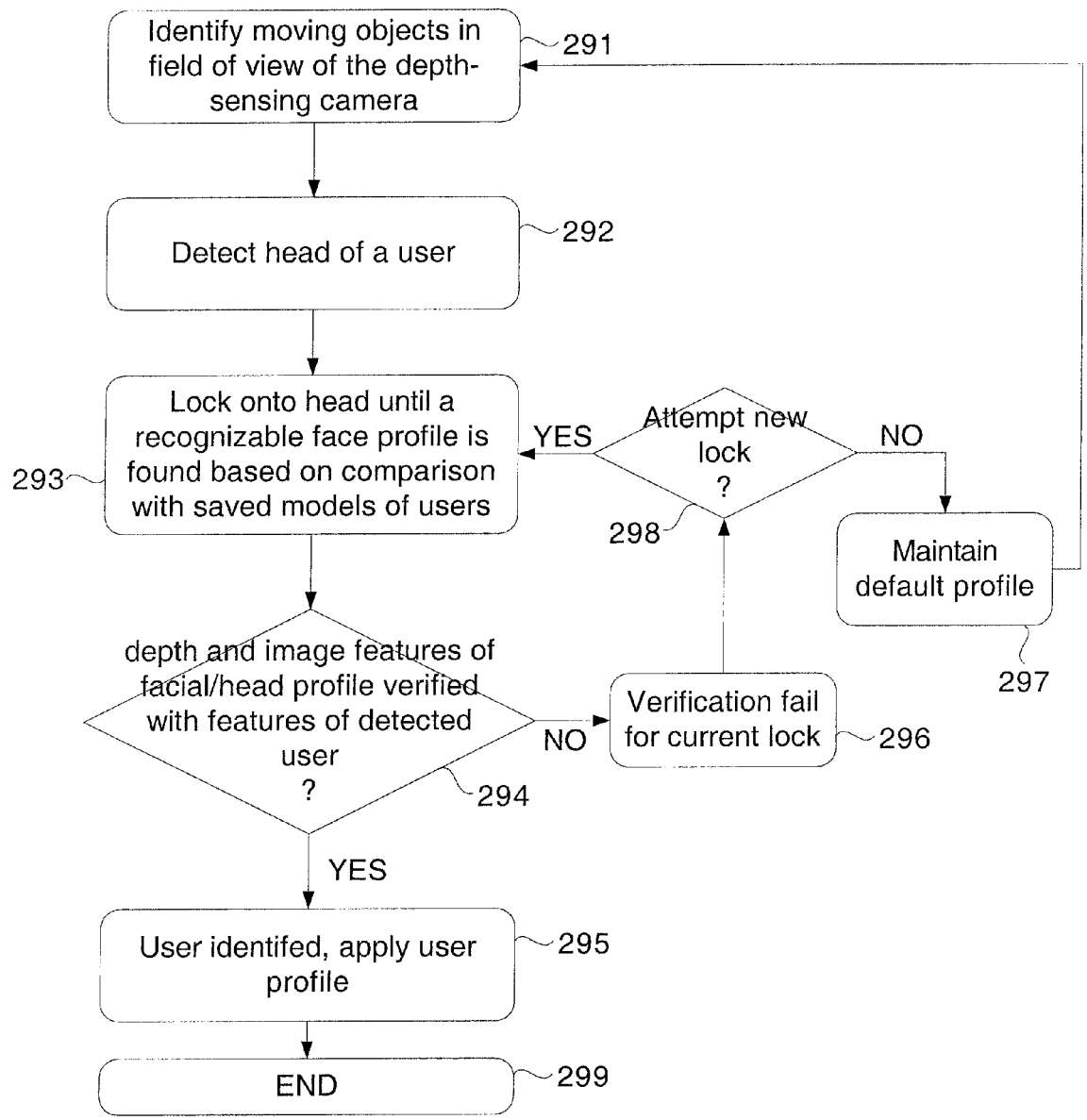
FIG. 2J is an exemplary flow chart illustrating exemplary operations within a procedure to identify a user within the field of view of the depth-sensing camera, in accordance with one embodiment of the present invention.

FIG. 2J is an exemplary flow chart illustrating exemplary operations within a procedure to identify a user within the field of view of the depth-sensing camera, in accordance with one embodiment of the present invention. Operation 291 identifies moving objects within the field of view of the depth-sensing camera. As will be discussed below, it is possible for the moving object to be a pet such as a cat or a dog. When identifying and tracking a pet, different operations may be required. The subsequent operations are concerned with identifying and tracking a human user, however, they can be modified to track non-human users. Operation 292 attempts to detect a head of a user within the moving objects. In one embodiment, the computer system can generically identify a head using generic facial characteristics such as eyes. In other embodiments, the head can be identified using combinations of facial characteristics such as, but not limited to eyes and mouth or eyes and nose.

Operation 293 begins tracking the head until a recognizable facial profile is found based on comparison with saved user models. Locking onto and tracking the head allows the computer system to compare the real-time image and depth data to stored user head and facial data. The depth-sensing camera can compare frames of real-time image and depth data recognizable facial profiles of the wire-frame models in an effort to identify the user. In one embodiment, the computer system analyzes the image data to determine the angle of the head in the real-time image and compares the facial and head data to similarly positioned data for the saved wire-frame models. Operation 294 attempts to verify saved user profile depth and image data with features detected on the real-time user. If the depth and image data is verified, operation 295 confirms that the user has been identified and applies the saved user profile. END operation 299 completes the procedure, although other operations can follow.

If the depth and image data in operation 294 is not verified, operation 296 recognizes that the real-time user has not been identified. Operation 298 is used to determine if the computer system will make another attempt to lock onto and track the user. In some embodiments, a threshold value can be set so the computer system tries to identify the user a predetermined number of times. In other embodiments, the computer system can continue to attempt to identify the user indefinitely. In still other embodiments, a variable number of attempts can be made to identify the user based on available computing resources. If another attempt to lock onto the user is made, the procedure returns to operation 293. Operation 297 maintains a default profile if there are no further attempts to lock onto the user.

FIGS. 3A-3C show an abbreviated set of exemplary screens that can be used to create a user profile for a pet, in accordance with one embodiment of the present invention. FIG. 3A illustrates screen 200b as a result of selecting button 208 from FIG. 2E. Screen 200b also shows dog icon 212 being selected. FIG. 3B illustrates screens 300a/b showing different methods of creating a dog avatar in accordance with embodiments of the present invention. Screen 300a illustrates creating an avatar using the depth-sensing camera to capture images of various aspects of the dog. The computer system can process the different images to automatically create a dog avatar along with profile information that will allow the dog to be recognized when it is within the field of view of the depth-sensing camera.

Screen 300b is an alternative dog avatar creation screen in accordance with one embodiment of the present invention. Screen 300b can allow a user to select various characteristics of their dog to create their dog avatar. For example, in one embodiment a user can begin by selecting the relative size of their dog avatar.

Figures 4A, 4B:
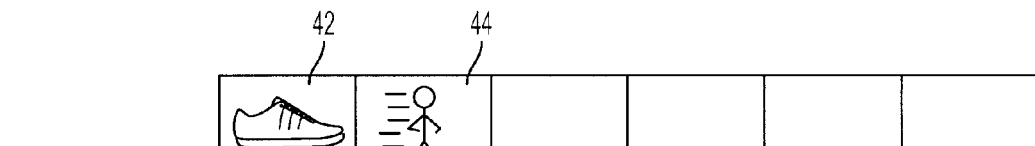
FIG. 4A illustrates an exemplary chart showing various privileges assigned to users in accordance with one embodiment of the present invention.
FIG. 4B is an exemplary chart illustrating animations created by users in accordance with one embodiment of the present invention.

FIG. 4A illustrates an exemplary chart 400 showing various media source privileges assigned to users in accordance with one embodiment of the present invention. Video game privileges 402 can be assigned to various users based on ratings assigned to games by the Entertainment Software Rating Board (ESRB). Similarly, television privileges 404 for each user can be set based on television parental guidelines. In various embodiments, different television parental guidelines can be loaded depending on the country where the computer system is installed. For computer systems installed in the United States, movie privileges 406 based on the Motion Picture Association of American (MPAA) rating system can be assigned to each user. Likewise, internet privileges 408 can configured to filter and restrict access to user specified content. In embodiments where the computer system is configured to provide access to music 410, privileges can be set to allow or deny users access to music with the Parental Advisory Label (PAL). The types of privileges illustrated in FIG. 4A are exemplary and should not be considered limiting as additional privileges not discussed can be assigned.

The privileges assigned to a user can be automatically applied to the various forms of media accessible through the computer system. For example, when the son 206 enters the field of view of the depth-sensing camera and is recognized by the computer system, the computer system will automatically load the privileges listed in FIG. 4A. Thus, the son 416 will only be allowed to access video games with an ESRB rating of E, television shows with a parental guideline of TV-Y7, and movies with a MPAA rating of G. Furthermore, internet access through the computer system will apply specified net filters and access to music with a PAL will be blocked.

In situations where more than one recognized user is identified by the computer system, the least restrictive privileges can be enabled. Thus, if son 206 and dad 202 are identified, the computer system will enable the privileges listed for dad 202. Similarly, if daughter 204 and son 206 are identified, the privileges listed for daughter 204 will be enabled.

FIG. 4B is an exemplary chart illustrating animations created by users in accordance with one embodiment of the present invention. Users can select or create individual icons that can be displayed on the screen when the respective identified user walks 412 within the field of view of the depth-sensing camera. As shown in FIG. 4B, when the son walks in front of the depth-sensing camera, blue sneakers 416 can be displayed on the screen tracing the son's real-world path across the room. Similarly, walking paths of the daughter can be assigned a pink footprint 418 while walking paths for the dog Sparky can be assigned black paw prints 420.

Users can also be assigned animations for actions such a running 414. For example, when the son runs, the avatar animation can automatically switch from the blue sneakers 416 to the son's avatar riding a skateboard 422. In a like manner, when the daughter is recognized by the computer system as running, her pink footprints 418 can change into inline skates 414 for the duration and distance she runs within the filed of view of the camera. Even Sparky can have his black paw prints 420 change to red paw prints 424 in the locations where he was running. Additional types of animations can be configured including, but not limited to, animations for user interaction with particular objects within the scene or even animations when combinations of recognized users are in the room. The particular animations are intended to provide examples of animations that are possible and should not be construed as limiting.

Figure 5A:
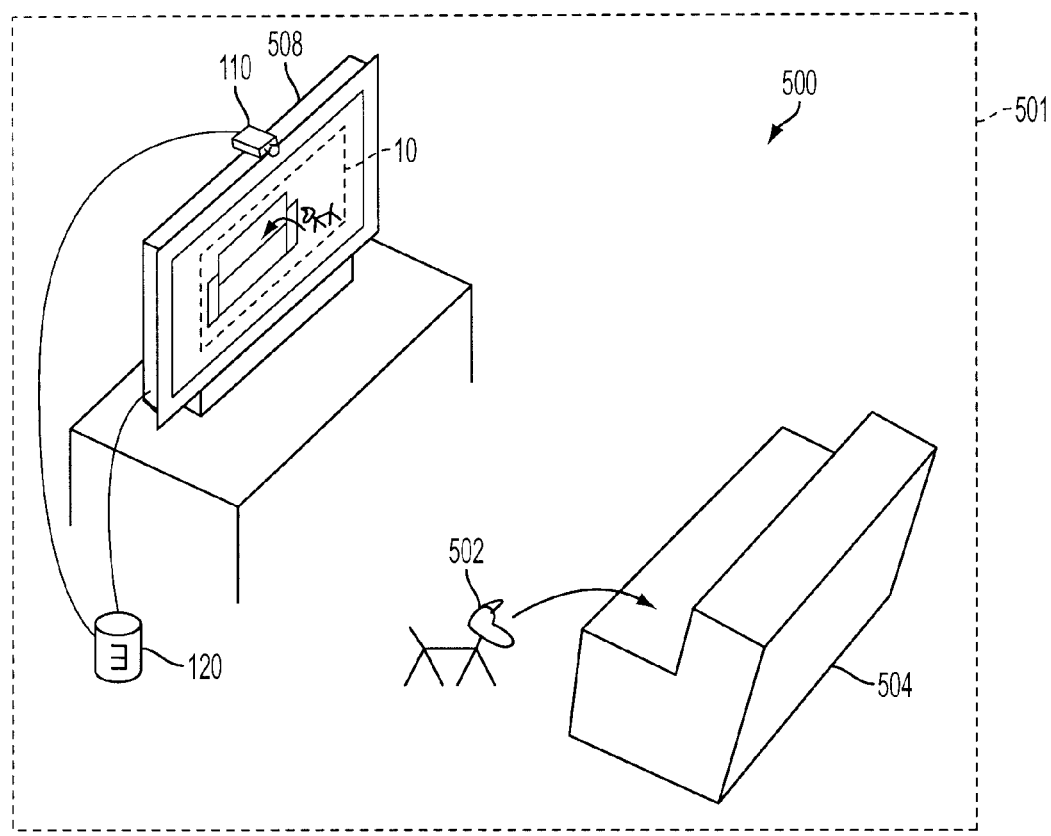
FIG. 5A illustrates a space including a real-world scene that is displayed on the screen as processed video, in accordance with one embodiment of the present invention.

FIG. 5A illustrates a space 501 including a real-world scene 500 that is displayed on the screen as processed video 10*a*/*b*, in accordance with one embodiment of the present invention. The real-world scene 500 includes a dog 502 and a sofa 504 within the field of view of a depth-sensing camera 110. The depth-sensing camera 110 provides images data to a computer system 120. The computer system 120 in turn supplies processed video 10*a*/*b* to the screen 508. In the real-world scene 500 the dog 502 jumps onto the sofa 504.

Figure 5B:
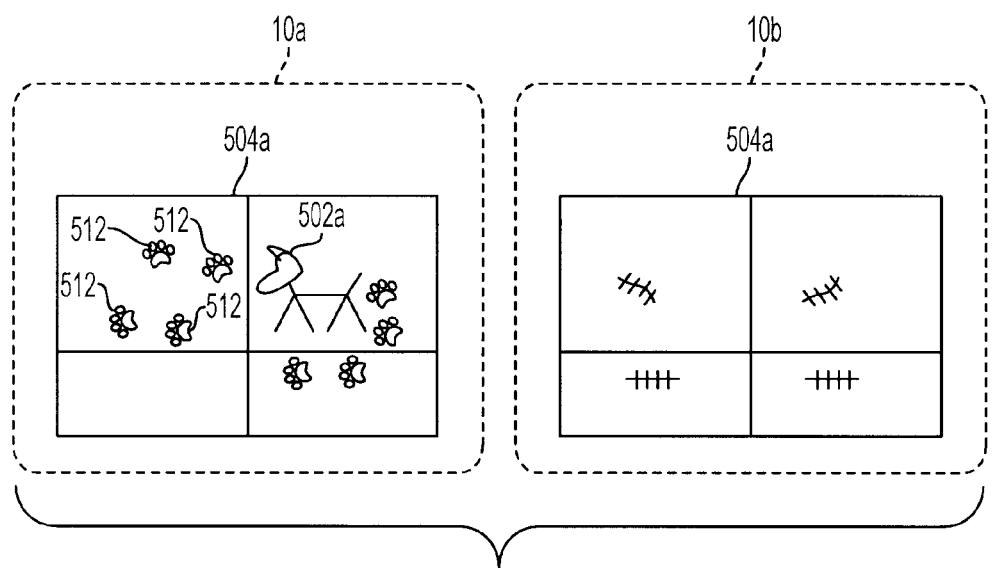
FIG. 5B shows exemplary processed video in accordance with embodiments of the present invention.

FIG. 5B shows exemplary processed video 10*a*/*b* in accordance with embodiments of the present invention. Processed video 10*a* illustrates the result of the computer system tracking the dog 502 over time as it walks on the sofa 504. As shown, a history path created with paw prints 512 is created on a virtual world sofa 504*a* by a dog avatar 502*a*. The processed video 10*a* is a result of the computer system recognizing the dog from image and depth data captured by the depth-sensing camera in scene 110. As part of defining the dog 502 for recognition by the computer system, a user could associate and save the paw print 512 animation with the dog 502. In other embodiments, real-time video images of the dog can be used instead of the dog avatar 502*a*. In embodiments where the dog 502 is not recognized by the computer system, a set of default tracking symbols or icons can be loaded and displayed as processed video 10*a*.

Processed video 10*b* illustrates an alternative animation specific to the dog 502 interacting with the sofa 504, in accordance with one embodiment of the present invention. In this embodiment a user has configured an animation to illustrate the virtual-world sofa 504*a* as being torn wherever the real world dog walked on the real-world sofa. As previously discussed, the computer system can create logs, or history paths that can be replayed and saved, of user actions that occur in front of the depth-sensing camera. In this case, the user can have the computer system monitor the scene and playback the movements of the real-world dog. For simplicity, processed video 10*a*/*b* does not show tracked movements of the dog before it jumped on the sofa. However, in various embodiments, it would be possible to track the movements of the dog via logged animations and create a time laps video illustrating various paw prints on the ground along with tears in the sofa.

Figure 6:
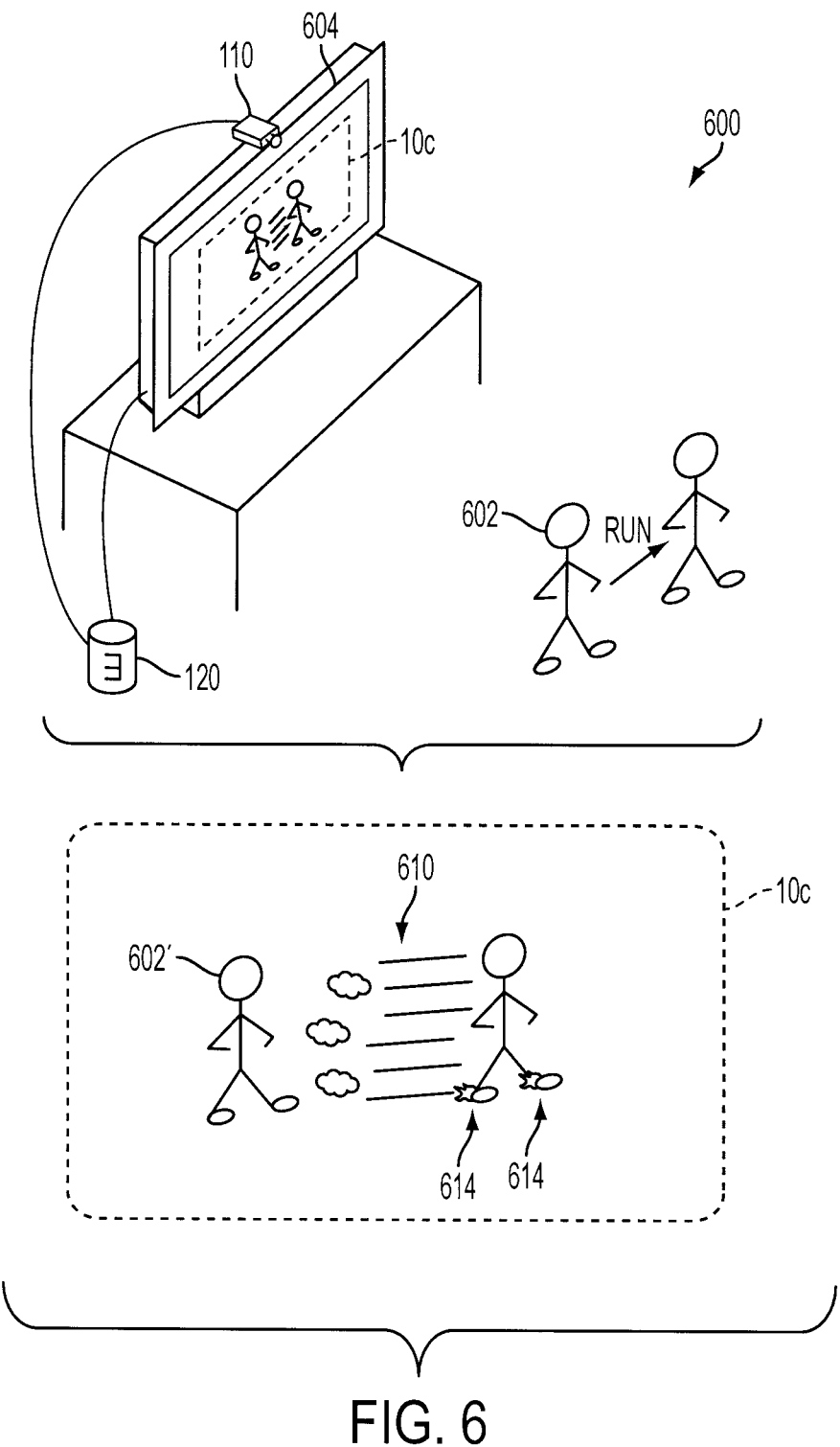
FIG. 6 illustrate a real-world scene and how the real-world scene is displayed on the screen as processed video 10c, in accordance with one embodiment of the present invention.

FIG. 6 illustrate a real-world scene 600 and how the real-world scene 600 is displayed on the screen as processed video 10*c*, in accordance with one embodiment of the present invention. The real-world scene 600 includes a user 602 running in front of a depth-sensing camera 110. The depth-sensing camera 110 captures video images of the user 602 running and sends them to a computer system 120 for processing. Processed video data is sent from the computer system 608 to the screen 604 and displayed as processed video 10*c*. The detail view of processed video 10*c* includes an avatar 602' that represents the user 602. Also shown in the detail view is an animation of the avatar 602' in response to the user 602 running. In one embodiment, the animation includes motion blurs 610 of the avatar 602' in order to convey a sense of speed. In another embodiment, puffs of clouds 612 can appear where the avatar 602 was originally standing before running was detected. In another embodiment, animated flames can appear on the shoes or feet of the avatar 602' in response to the running. In one embodiment, the history paths and animations discussed in FIG. 5A-6 can also be saved to a memory associated with the computer system for playback. In some embodiments, the memory can be a local storage device such as a hard drive or other non-volatile memory. In other embodiments, the history paths and animations can be uploaded to remote storage via the Internet.

Figure 7:
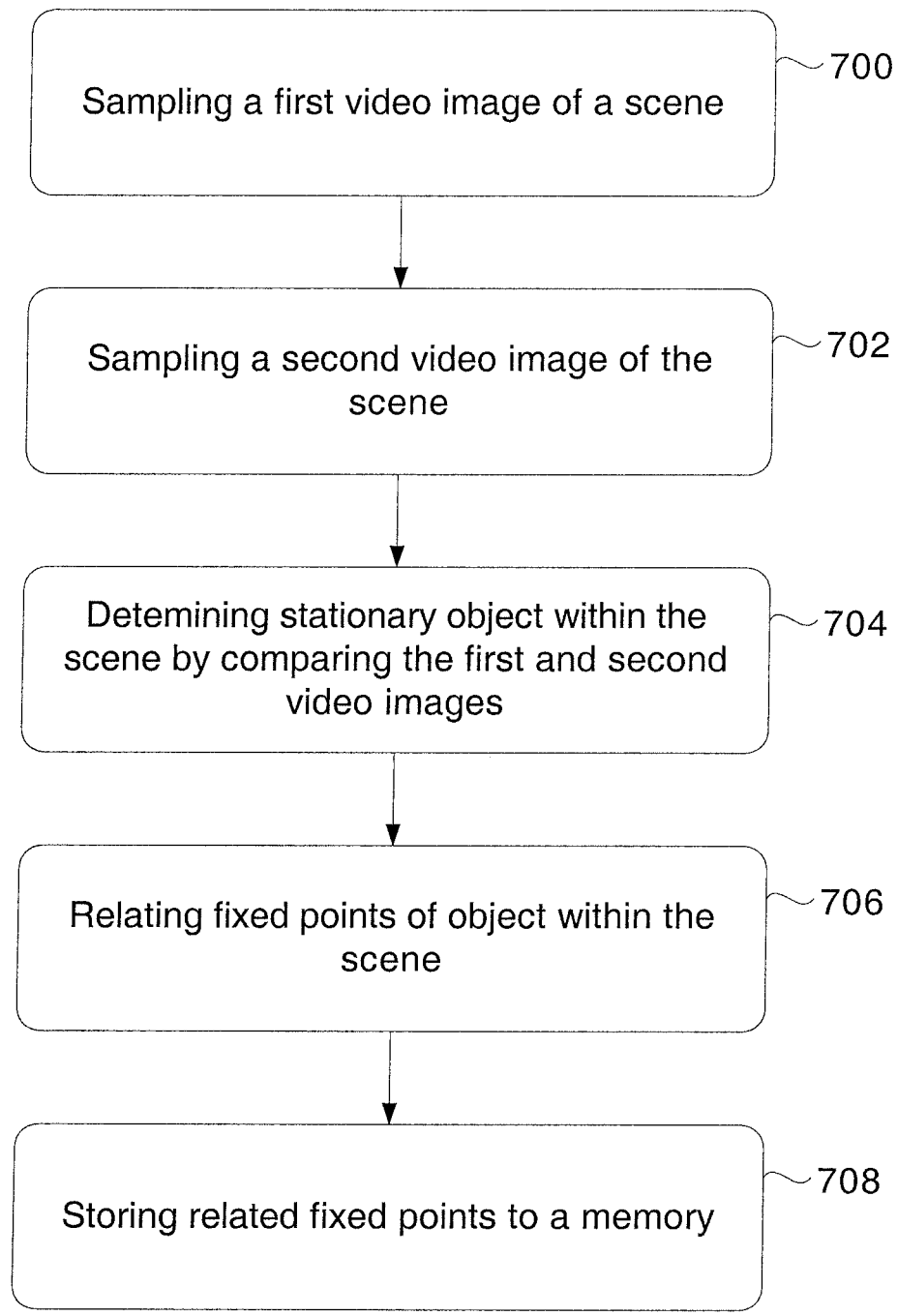
FIG. 7 is an exemplary flow chart illustrating operations to apply point tracking in order to improve identification and tracking of recognized objects.

FIG. 7 is an exemplary flow chart illustrating operations to apply point tracking in order to improve identification and tracking of recognized objects. Operation 700 captures a first image of a scene using the depth-sensing camera. Operation 702 uses the depth-sensing camera to capture a second image of the scene. As the objective is to identify stationary objects, the amount of time between capturing the first and second images may vary. In some embodiments, the images may be sampled fractions of seconds or seconds apart while in other embodiments the images may be sampled minutes, hours or even days apart. Operation 704 is used to determine stationary objects within the scene by comparing the first image and the second image. The comparison can attempt to match identified points in the first image to corresponding points in the second image. An identified point can be determined to be stationary if it has not moved between the first image and the second image. In one embodiment, the depth-sensing camera samples images periodically to continuously update stationary objects are reduce computational overhead. Operation 706 relates fixed points of identified stationary objects within the scene in order to construct a model of stationary object within the scene. Operation 708 stores the related fixed points to a memory to aid in tracking and identifying objects within the field of view of the depth-sensing camera.

Figure 8:
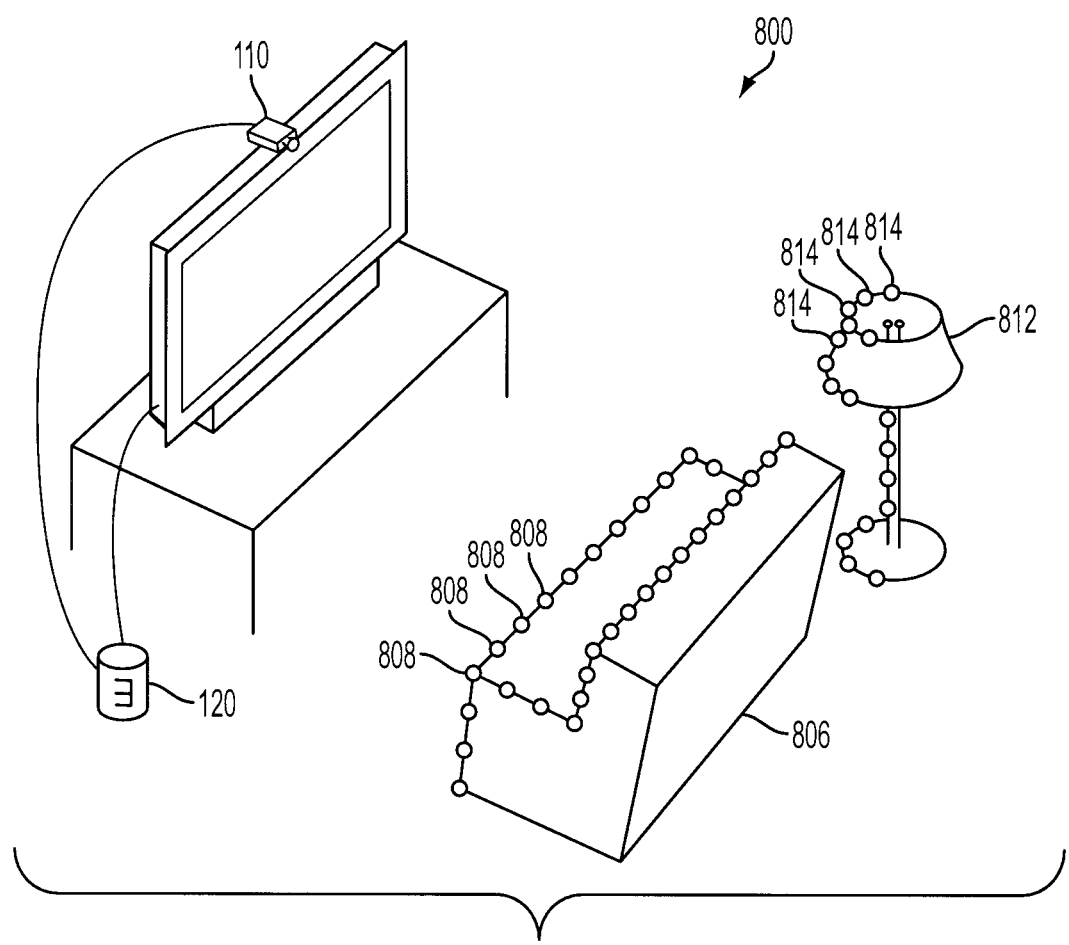
FIG. 8 is an exemplary view of a scene illustrating point tracking in accordance with one embodiment of the present invention.

FIG. 8 is an exemplary view of a scene 800 illustrating point tracking in accordance with one embodiment of the present invention. The scene 800 includes a depth-sensing camera 110 that provides image data to a computer system 120. The computer system 120 processes the image data and provides processed video to be displayed on the screen 802. The scene also includes stationary objects such as a sofa 806 and a lamp 812. In one embodiment, the computer system 810 can determine which objects in the scene 800 are stationary by comparing two images captured by the depth-sensing camera 800. The computer system 120 can execute software capable of identifying points within the first image that have not moved in the second image. The non-moving points can be designated as stationary points. In FIG. 8, stationary points 808 have been identified on the sofa 806 and stationary points 814 have been identified on the lamp 812. The computer system 120 can also co-relate stationary points to define relative positioning of objects within the scene 800. With known relative positions, the computer system 120 can more efficiently process image data from the depth-sensing camera 110 to allow faster rendering of avatars representing real-world object, such as users, moving within the scene 800.

In other embodiments, the image and depth data along with point tracking can allow partial wireframes or skeletons to be built for stationary objects. For examples, the stationary points 808 associated with the sofa 806 can be used to create a partial wireframe model of the sofa 806. Texture maps can be applied to the wireframe model to allow users to modify and customize a virtual sofa created from image and depth data of their real sofa 806. For example, a user could modify the sofa material from any variety of woven or textured fabrics to leathers and synthetic materials. Texture maps can be applied to any stationary object within any scene including but not limited to walls and the lamp 812 of scene 800. A user can scan and room with the depth-sensing camera 110 capturing image and depth data of the real-world room and then customize a virtual world representation of the real-world room. The image and depth data can be used to modify the color of walls or even apply various types of wall coverings including textured wall coverings such as wallpaper or wood paneling.

Figure 9:
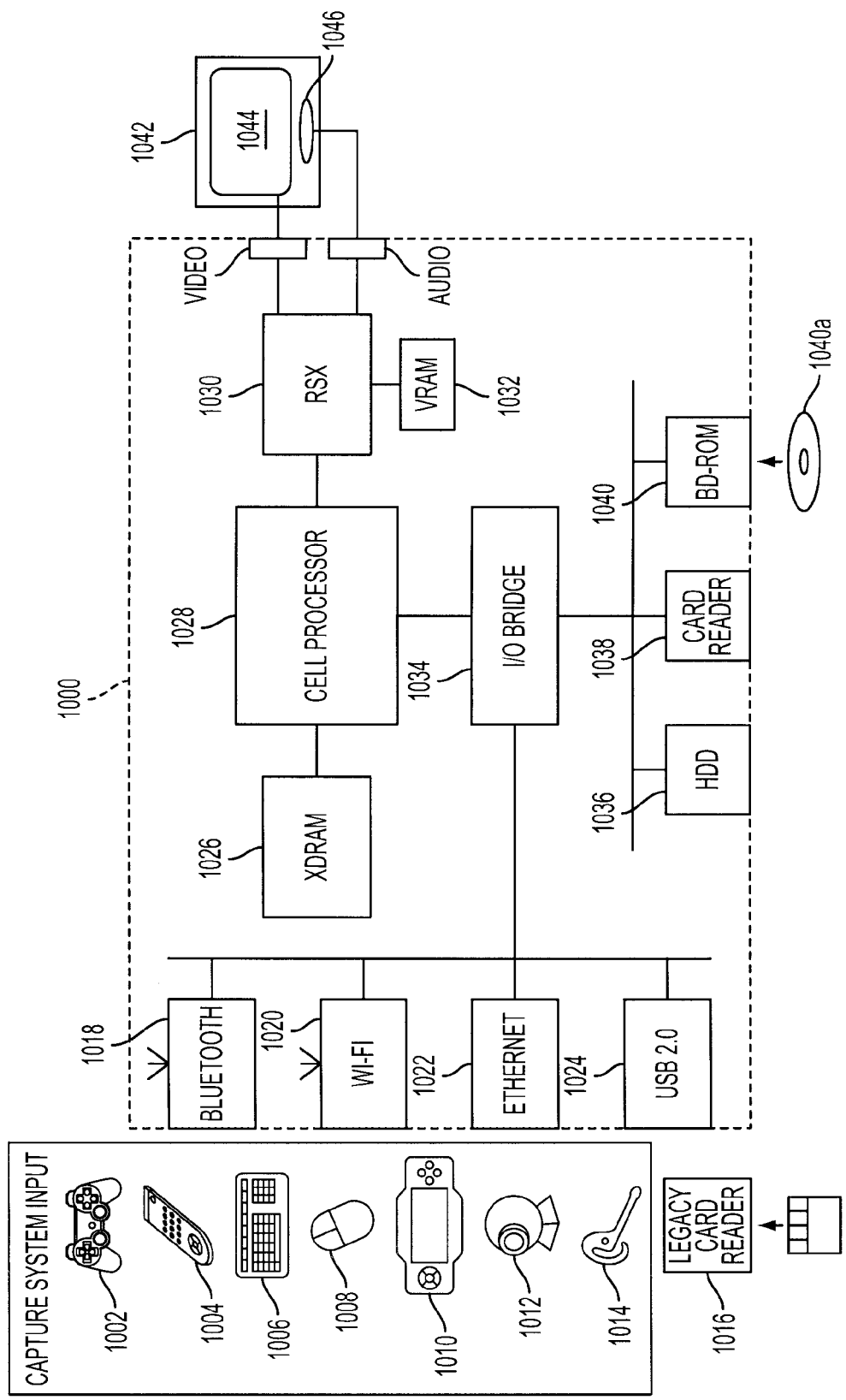
FIG. 9 schematically illustrates the overall system architecture of the Sony® Playstation 3® entertainment device, a computer system capable of utilizing dynamic three-dimensional object mapping to create user-defined controllers in accordance with one embodiment of the present invention.

FIG. 9 schematically illustrates the overall system architecture of the Sony® Playstation 3® entertainment device, a computer system capable of utilizing dynamic three-dimensional object mapping to create user-defined controllers in accordance with one embodiment of the present invention. A system unit 1000 is provided, with various peripheral devices connectable to the system unit 1000. The system unit 1000 comprises: a Cell processor 1028; a Rambus® dynamic random access memory (XDRAM) unit 1026; a Reality Synthesizer graphics unit 1030 with a dedicated video random access memory (VRAM) unit 1032; and an I/O bridge 1034. The system unit 1000 also comprises a Blu Ray® Disk BD-ROM® optical disk reader 1040 for reading from a disk 1040a and a removable slot-in hard disk drive (HDD) 1036, accessible through the I/O bridge 1034. Optionally the system unit 1000 also comprises a memory card reader 1038 for reading compact flash memory cards, Memory Stick® memory cards and the like, which is similarly accessible through the I/O bridge 1034.

The I/O bridge 1034 also connects to six Universal Serial Bus (USB) 2.0 ports 1024; a gigabit Ethernet port 1022; an IEEE 802.11b/g wireless network (Wi-Fi) port 1020; and a Bluetooth® wireless link port 1018 capable of supporting of up to seven Bluetooth connections.

In operation the I/O bridge 1034 handles all wireless, USB and Ethernet data, including data from one or more game controllers 1002. For example when a user is playing a game, the I/O bridge 1034 receives data from the game controller 1002 via a Bluetooth link and directs it to the Cell processor 1028, which updates the current state of the game accordingly.

The wireless, USB and Ethernet ports also provide connectivity for other peripheral devices in addition to game controllers 1002, such as: a remote control 1004; a keyboard 1006; a mouse 1008; a portable entertainment device 1010 such as a Sony Playstation Portable® entertainment device; a video camera such as an EyeToy® video camera 1012; and a microphone headset 1014. Such peripheral devices may therefore in principle be connected to the system unit 1000 wirelessly; for example the portable entertainment device 1010 may communicate via a Wi-Fi ad-hoc connection, whilst the microphone headset 1014 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1016 may be connected to the system unit via a USB port 1024, enabling the reading of memory cards 1048 of the kind used by the Playstation® or Playstation 2® devices.

In the present embodiment, the game controller 1002 is operable to communicate wirelessly with the system unit 1000 via the Bluetooth link. However, the game controller 1002 can instead be connected to a USB port, thereby also providing power by which to charge the battery of the game controller 1002. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1004 is also operable to communicate wirelessly with the system unit 1000 via a Bluetooth link. The remote control 1004 comprises controls suitable for the operation of the Blu Ray Disk BD-ROM reader 1040 and for the navigation of disk content.

The Blu Ray Disk BD-ROM reader 1040 is operable to read CD-ROMs compatible with the Playstation and PlayStation 2 devices, in addition to conventional pre-recorded and recordable CDs, and so-called Super Audio CDs. The reader 1040 is also operable to read DVD-ROMs compatible with the Playstation 2 and PlayStation 3 devices, in addition to conventional pre-recorded and recordable DVDs. The reader 1040 is further operable to read BD-ROMs compatible with the Playstation 3 device, as well as conventional pre-recorded and recordable Blu-Ray Disks.

The system unit 1000 is operable to supply audio and video, either generated or decoded by the Playstation 3 device via the Reality Synthesizer graphics unit 1030, through audio and video connectors to a display and sound output device 1042 such as a monitor or television set having a display 1044 and one or more loudspeakers 1046. The audio connectors 1050 may include conventional analogue and digital outputs whilst the video connectors 1052 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1028. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1012 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1000. The camera LED indicator is arranged to illuminate in response to appropriate control data from the system unit 1000, for example to signify adverse lighting conditions. Embodiments of the video camera 1012 may variously connect to the system unit 1000 via a USB, Bluetooth or Wi-Fi communication port. Embodiments of the video camera may include one or more associated microphones that are also capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 1000, an appropriate piece of software such as a device driver should be provided. Device driver technology is well-known and will not be described in detail here, except to say that the skilled man will be aware that a device driver or similar software interface may be required in the present embodiment described.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data that can be thereafter read by a computer system, including an electromagnetic wave carrier. Examples of the computer readable medium include hard drives, network attached storage (NAS), read-only memory, random-access memory, CD-ROMS, CD-Rs, CD-RWS, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method, comprising:
   (a) defining and saving to a memory, a user profile, the user profile including data for identifying and tracking the user with a depth sensing camera;
   (b) defining and saving to the memory, animations to be integrated into a virtual world scene based on the user profile;
   (c) capturing a scene using the depth sensing camera;
   (d) identifying the user within the scene using the depth sensing camera, the identifying further configured to identify stationary objects in the scene, wherein points located on the stationary objects are used to at least partially outline the identified stationary objects; and (e) automatically applying the defined animations onto at least one identified stationary object in the scene to be displayed on a screen, such that the defined animations are selected for the identified and tracked user.

2. The method of claim 1, wherein capturing the scene includes filtering out stationary objects so as to focus on moving objects, and focusing on moving objects includes, focusing on a moving object is in the scene;

analyzing features of the moving object using the image and depth data; and determining if the moving object correspond to the user.

3. The method of claim 2, wherein the user is one of a human or a pet.

4. The method of claim 3, wherein tracking the user further includes, displaying a history path of the user, the history path of the user identifying the movement over time and the animations associated with the movements.

5. The method of claim 4, further comprising:

saving the history path to storage; and enabling replay of the history path.

6. The method of claim 1, wherein the animations are applied to contours of the at least one stationary object found in the scene, based on the captured depth data.

7. The method of claim 1, further comprising:

pre-selecting the animations for the user, and pre-selecting other animations for other users.

8. The method of claim 1, wherein multimedia content is presented on the display screen along with the animations, based on the identified user.

9. A computer-implemented method, comprising:

(a) defining and saving to a memory, a user profile, the user profile including data for identifying and tracking the user with a depth sensing camera;

(b) defining and saving to the memory, animations to be applied into a virtual world scene associated with the user profile;

(c) capturing a scene using the depth sensing camera;

(d) identifying the user within the scene using the depth sensing camera;

(e) automatically applying the defined animations onto objects or stationary objects found in the captured scene using point tracking, the defined animations being pre-defined for the identified and tracked user, so that a display screen shows the applied animations.

10. A computer implemented method, comprising:

(a) defining a user profile, the user profile including image and depth data related to physical characteristics of a real-world user, the image and depth data captured by a depth-sensing camera;

(b) capturing image and depth data for a scene using the depth-sensing camera, wherein point tracking is used to identify stationary objects in the scene, the points being used to draw outlines of stationary objects found in the scene;

(c) identifying moving objects within the scene;

(d) locking the depth-sensing camera onto a human head within the scene;

(e) analyzing the image and depth data for the human head in real-time, the analysis including comparing image and depth data for the human head to user profile image and depth data related to physical characteristic, wherein a user is identified when image and depth data within the user profile substantially matches image and depth data for the head, and identifying animations pre-selected for the user profile when the user is identified; and (f) applying the identified animations onto selected ones of the stationary objects identified in the scene.

11. The method of claim 10, wherein defining a user profile includes:

i. initiating a scan using a depth-sensing camera;

ii. focusing the scan to a particular portion of the human body;

iii. collecting image and depth data for the particular portion of the human body;

iv. processing the collected image and depth data to generate a three-dimensional model of the particular portion of the human body; and v. saving the three-dimensional model to a memory, the three-dimensional model also being associated with a user profile.

12. The method of claim 10, further comprising:

applying user permissions associated with the user profile when the user is identified.

\* \* \* \* \*